(12) United States Patent
Phillips et al.

(10) Patent No.: US 9,836,907 B2
(45) Date of Patent: Dec. 5, 2017

(54) TOOL TRAINING FOR AUTOMATED TOOL CONTROL SYSTEMS

(71) Applicant: SNAP-ON INCORPORATED, Kenosha, WI (US)

(72) Inventors: Preston Phillips, Conway, AR (US); David C. Fly, Maumelle, AR (US); Matthew J. Lipsey, Sherwood, AR (US); Joseph Chwan, Jr., Mechanicsburg, PA (US); Frederick J. Rogers, N. Little Rock, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 484 days.

(21) Appl. No.: 13/916,245

(22) Filed: Jun. 12, 2013

(65) Prior Publication Data
US 2014/0025543 A1 Jan. 23, 2014

Related U.S. Application Data

(60) Provisional application No. 61/658,729, filed on Jun. 12, 2012.

(51) Int. Cl.
*G06Q 10/08* (2012.01)
*G07C 9/00* (2006.01)
(Continued)

(52) U.S. Cl.
CPC .......... *G07C 9/00912* (2013.01); *B25H 3/00* (2013.01); *B25H 3/028* (2013.01); *G06F 3/0486* (2013.01);
(Continued)

(58) Field of Classification Search
CPC ...... G06Q 50/04; G06Q 10/087; G06Q 10/06; G06Q 20/208; G06K 17/00; G06K 9/00
(Continued)

(56) References Cited

U.S. PATENT DOCUMENTS 5,205,436 A * 4/1993 Savage ............... A47F 3/02 221/1
5,591,956 A * 1/1997 Longacre et al. ......... 235/462.1
(Continued)

FOREIGN PATENT DOCUMENTS

CN 201291451 Y 8/2009
CN 102177524 A 9/2011
(Continued)

OTHER PUBLICATIONS

International Search Report issued in International Application No. PCT/US2013/045472 Nov. 8, 2013.
(Continued)

*Primary Examiner* — Vanel Frenel
(74) *Attorney, Agent, or Firm* — McDermott Will & Emery LLP

(57) ABSTRACT

An inventory control system and method determines an inventory condition of objects stored in the system. Embodiments include a storage container including a plurality of storage locations for storing objects; an image sensing device to capture image data of the container, including image data of the plurality of storage locations and a target area that includes an individual object storage location having less than the plurality of storage locations; a data storage device for storing the image data of the container; and a data processor. The processor receives initial image data representing an initial image of the plurality of storage locations, and image data representing an image of the target area captured subsequent to the initial image; modifies the initial image data based on the image data of the target area to generate adjusted image data; and stores the adjusted image data in the data storage device.

7 Claims, 21 Drawing Sheets

(51) Int. Cl.
*G06K 9/00* (2006.01)
*G06F 3/0486* (2013.01)
*B25H 3/00* (2006.01)
*B25H 3/02* (2006.01)

(52) U.S. Cl.
CPC ....... *G06K 9/00771* (2013.01); *G06Q 10/087* (2013.01); *G07C 9/00031* (2013.01); *G07C 9/00039* (2013.01); *G07C 9/00111* (2013.01); *G07C 9/00896* (2013.01)

(58) Field of Classification Search
USPC .............. 705/28; 340/3.1, 5.1, 5.2; 235/385; 700/236; 382/103
See application file for complete search history.

(56) References Cited

U.S. PATENT DOCUMENTS

| | | | |
|---|---|---|---|
| 5,725,096 | A | 3/1998 | Winnard |
| 6,568,593 | B2* | 5/2003 | Hetzer .......................... 235/385 |
| 6,707,381 | B1 | 3/2004 | Maloney |
| 6,744,436 | B1 | 6/2004 | Chirieleison, Jr. et al. |
| 6,840,451 | B2* | 1/2005 | Allen ...................... G06Q 10/06 235/462.09 |
| 6,989,749 | B2* | 1/2006 | Mohr .................... G06Q 10/087 235/385 |
| 7,109,864 | B2 | 9/2006 | Maloney |
| 7,336,174 | B1* | 2/2008 | Maloney ............ G08B 13/1427 340/568.1 |
| 7,743,391 | B2 | 6/2010 | Balaji et al. |
| 7,942,321 | B2 | 5/2011 | Linton et al. |
| 7,956,847 | B2 | 6/2011 | Christie |
| 8,036,939 | B2 | 10/2011 | Gil et al. |
| 2002/0143672 | A1* | 10/2002 | Sawasaki ........... G06Q 10/0875 705/29 |
| 2003/0095710 | A1* | 5/2003 | Tessadro ............... G06T 7/0083 382/199 |
| 2003/0102970 | A1 | 6/2003 | Creel et al. |
| 2004/0046020 | A1* | 3/2004 | Andreasson et al. ......... 235/385 |
| 2007/0023193 | A1 | 2/2007 | King |
| 2007/0177045 | A1 | 8/2007 | Karasawa |
| 2007/0188615 | A1* | 8/2007 | Beniyama ............ G05D 1/0246 348/207.99 |
| 2007/0237369 | A1 | 10/2007 | Brunner et al. |
| 2008/0059338 | A1* | 3/2008 | Hubbard ........................ 705/28 |
| 2008/0117053 | A1 | 5/2008 | Maloney |
| 2008/0303904 | A1 | 12/2008 | Hsieh |
| 2009/0060349 | A1* | 3/2009 | Linaker .............. G06K 9/00664 382/209 |
| 2009/0063306 | A1* | 3/2009 | Fano ........................ G06K 9/00 705/28 |
| 2009/0072029 | A1 | 3/2009 | Martin |
| 2009/0109004 | A1 | 4/2009 | Van Alstyne |
| 2009/0208198 | A1* | 8/2009 | Khuntia ................. G03B 15/06 396/174 |
| 2010/0039513 | A1 | 2/2010 | Glickman et al. |
| 2010/0045423 | A1 | 2/2010 | Glickman et al. |
| 2010/0046791 | A1 | 2/2010 | Glickman et al. |
| 2010/0111411 | A1 | 5/2010 | Ernst et al. |
| 2010/0179890 | A1 | 7/2010 | Cianciotto, Jr. et al. |
| 2010/0205044 | A1 | 8/2010 | Scheer |
| 2010/0252626 | A1 | 10/2010 | Elizondo et al. |
| 2010/0312859 | A1 | 12/2010 | Lev et al. |
| 2011/0025503 | A1* | 2/2011 | Weaver .................. G08B 21/24 340/572.1 |
| 2011/0121699 | A1 | 5/2011 | Freimuth |
| 2011/0153614 | A1 | 6/2011 | Solomon |
| 2012/0271742 | A1 | 10/2012 | Solomon |
| 2012/0327202 | A1 | 12/2012 | Nagamachi |

FOREIGN PATENT DOCUMENTS

| | | |
|---|---|---|
| EP | 1808275 A2 | 7/2007 |
| GB | 2453977 A | 4/2009 |
| WO | 2008/029159 A1 | 3/2008 |
| WO | 2009053703 A2 | 4/2009 |
| WO | 2010017531 A2 | 2/2010 |

OTHER PUBLICATIONS

Transmittal of the International Search Report and Written Opinion issued in PCT/US2013/045472 dated Nov. 8, 2013.
International Search Report issued in Application No. PCT/US2013/045492 dated Jan. 14, 2014.
International Search Report and Written Opinion issued in International Application No. PCT/US2013/045469 mailed Jun. 4, 2014.
International Search Report issued in Application No. PCT/US2013/45489 dated Feb. 21, 2014.
Final U.S. Office Action dated Apr. 30, 2015 issued in corresponding U.S. Appl. No. 13/916,351.
Chinese Office Action dated Jul. 27, 2015 issued in Chinese Patent Application No. 201380039245.9 (English translation).
U.S. Office Action dated Sep. 25, 2015 issued in U.S. Appl. No. 13/916,192.
U.S. Office Action dated Jun. 29, 2015 issued in U.S. Appl. No. 13/916,374.
U.S. Office Action issued in U.S. Appl. No. 13/916,351 dated Oct. 24, 2014.
U.S. Office Action dated Mar. 1, 2016, issued in related U.S. Appl. No. 13/916,351.
U.S. Office Action dated Jan. 29, 2016, issued in related U.S. Appl. No. 13/916,374.
The Extended European Search Report dated Apr. 1, 2016, issued in European Application No. 13804853.3.
Chinese Office Action dated Mar. 8, 2016, issued in Chinese Application No. 201380039245.9. (w/ English translation).
Extended European Search Report dated Mar. 23, 2016, issued in European Application No. 13805090.1.
Extended European Search Report dated Apr. 1, 2016, issued in European Application No. 13804853.3.
Extended European Search Report dated Mar. 24, 2016, issued in European Application No. 15002055.0.
The Extended European Search Report dated Mar. 31, 2016, issued in European Application No. 13803597.7.
The Extended European Search Report dated Apr. 6, 2016, issued in European Application No. 13860269.3.
Non-Final Office Action dated Nov. 18, 2016, issued in U.S. Appl. No. 13/916,192.
Non-Final Office Action dated Dec. 2, 2016, issued in U.S. Appl. No. 14/954,378.
Third Chinese Office Action dated Sep. 13, 2016, issued in Chinese Patent Application No. 201380039245.9. (w/English translation).
Final Office Action dated Aug. 8, 2016, issued in U.S. Appl. No. 13/916,351.
Final Office Action dated Jul. 14, 2016, issued in U.S. Appl. No. 13/916,192.
Non-Final Office Action dated Aug. 25, 2016, issued in U.S. Appl. No. 13/916,374.
Non-Final Office Action dated Mar. 13, 2017, issued in U.S. Appl. No. 13/916,351.
Final Office Action dated Feb. 23, 2017, issued in U.S. Appl. No. 13/916,374.
Non-Final Office Action dated Apr. 14, 2017, issued in U.S. Appl. No. 14/954,378.
Restriction Requirement dated May 9, 2017, issued in U.S. Appl. No. 13/916,374.
First Chinese Office Action dated Dec. 2, 2016, issued in Chinese patent Application No. 201380039633.7. (w/English translation).
International Preliminary Report on Patentability issued in International Application No. PCT/US2013/045489, dated Dec. 24, 2014.
International Preliminary Report on Patentability issued in International Application No. PCT/US2013/045472, dated Dec. 24, 2014.
International Preliminary Report on Patentability issued in International Application No. PCT/US2013/045492, dated Dec. 24, 2014.
International Preliminary Report on Patentability issued in International Application No. PCT/US2013/045469, dated Dec. 24, 2014.

(56) References Cited

OTHER PUBLICATIONS

First Chinese Office Action dated Mar. 10, 2017, issued in Chinese Patent Application No. 201380039710.9. (w/ English translation).
Notice of Allowance issued in U.S. Appl. No. 13/916,351, dated Sep. 18, 2017.
Non-Final Office Action issued in U.S. Appl. No. 14/954,378, dated Sep. 20, 2017.
Final Office Action issued in U.S. Appl. No. 14/654,378, dated Aug. 17, 2017.
Non-Final Office Action issued in U.S. Appl. No. 13/916,374, dated Aug. 16, 2017.
Second Chinese Office Action issued in Chinese Patent Application 2017072801875190, dated Aug. 2, 2017.

* cited by examiner

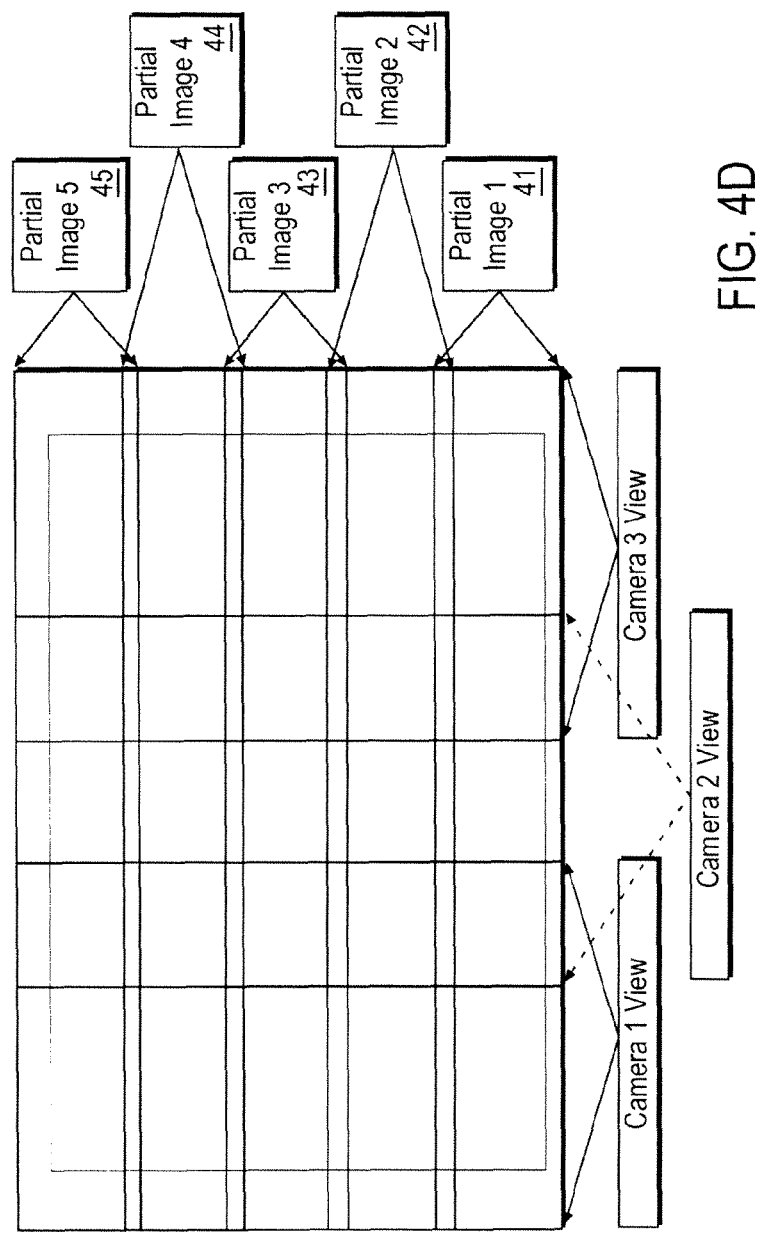

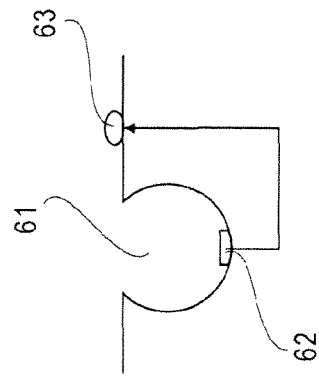
FIG. 5B
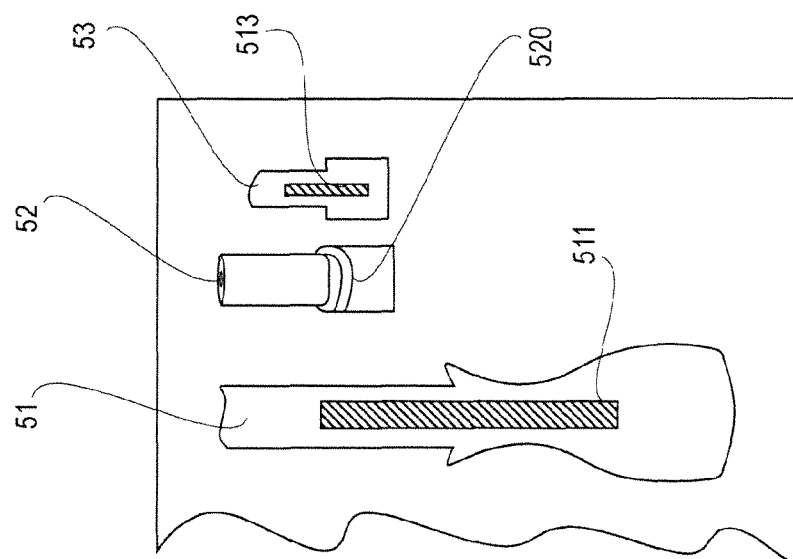
FIG. 5A
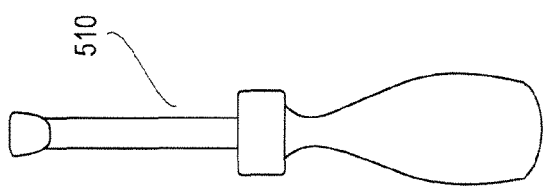

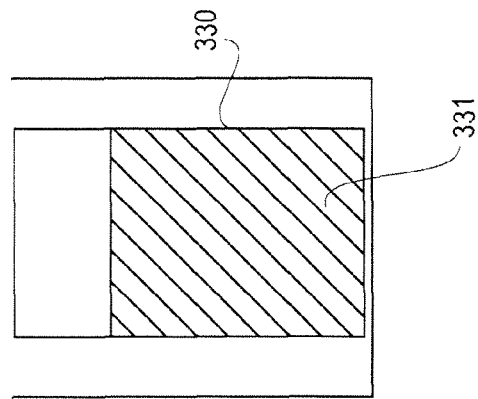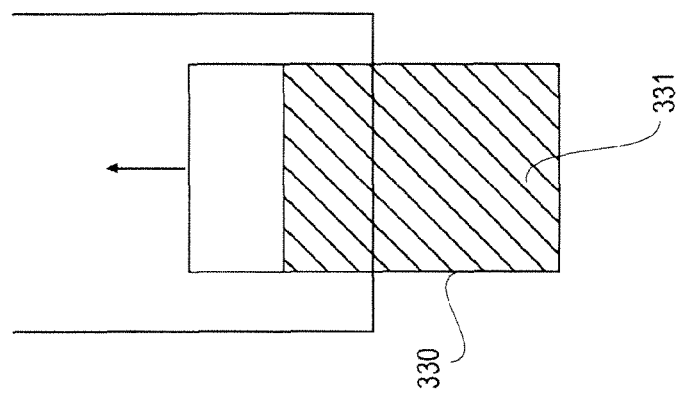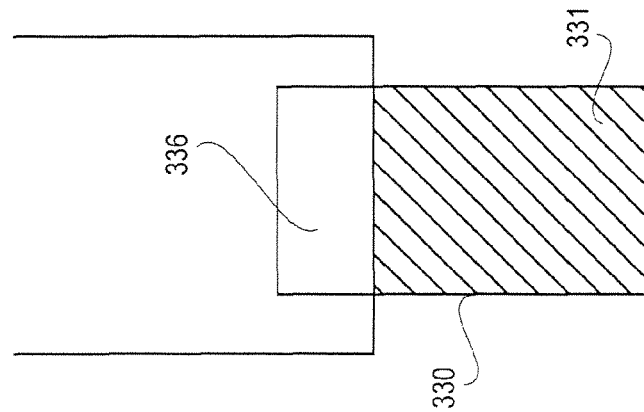

AUDIT TRACK

Audit Trail — 910

| Date / Time | Employee Name |
|---|---|
| 7/31/2008 5:31:12 PM | Andy Mechanic |
| 7/31/2008 3:38:04 PM | Mike Gill |
| 7/31/2008 10:49:04 AM | David Jackson |
| 7/31/2008 9:14:04 AM | Joe Chwan |
| 7/31/2008 8:40:04 AM | Andy Mechanic |
| 7/30/2008 6:37:04 PM | David Jackson |
| 7/30/2008 1:59:04 PM | David Jackson |
| 7/30/2008 11:02:12 AM | Mike Gill |
| 7/30/2008 10:01:43 AM | Joe Chwan |
| 7/30/2008 9:45:24 AM | Mike Gill |
| 7/30/2008 9:28:16 AM | David Jackson |
| 7/30/2008 8:54:27 AM | Joe Chwan |
| 7/30/2008 7:31:18 AM | David Jackson |

Flowchart for individual tool training process

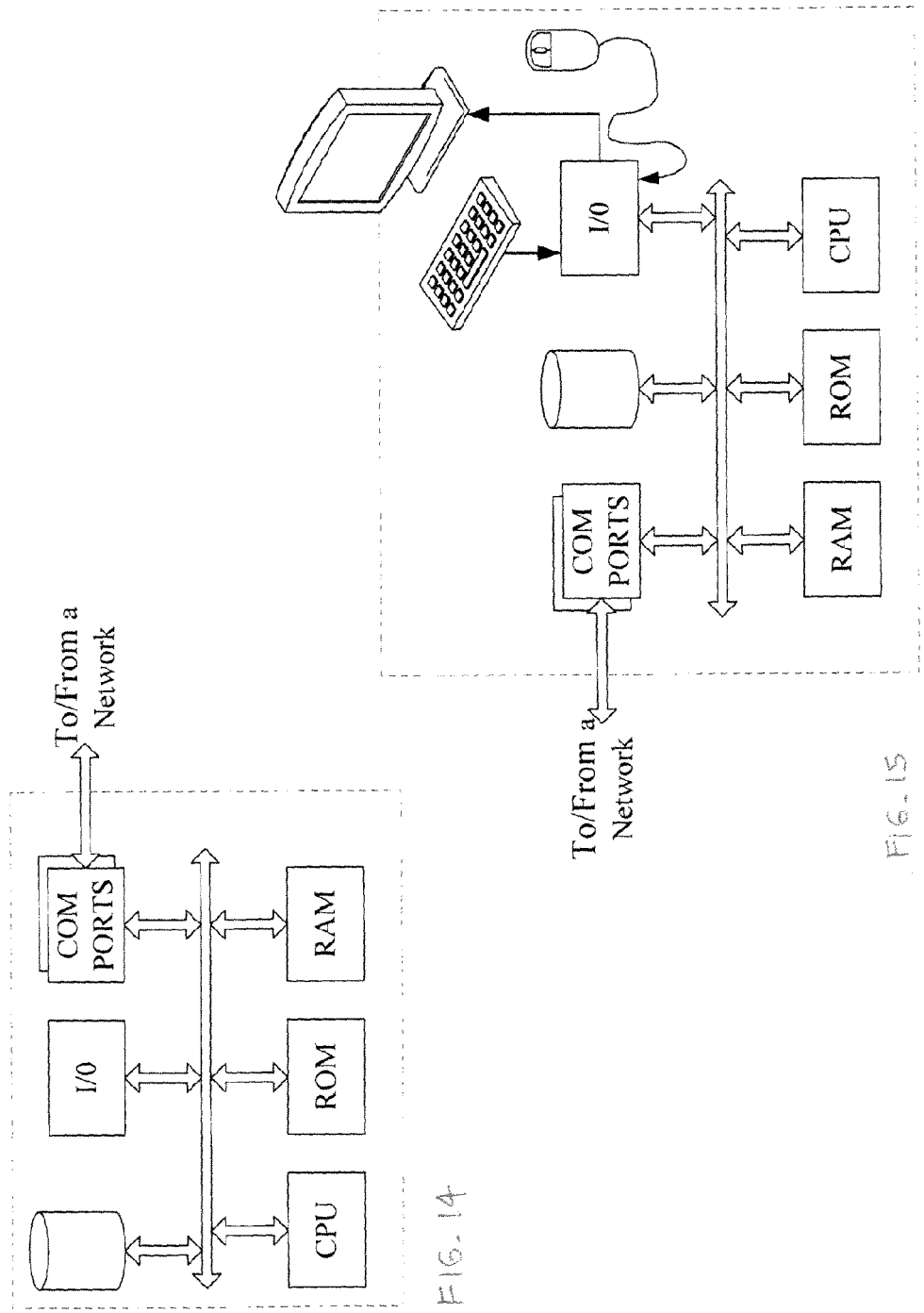

TOOL TRAINING FOR AUTOMATED TOOL CONTROL SYSTEMS

RELATED APPLICATION

The present invention claims priority of provisional patent application No. 61/658,729, filed Jun. 12, 2012, the contents of which are incorporated herein in their entirety.

TECHNICAL FIELD

The present subject matter relates to features and functions of an electronic inventory control system, in particular an image-based inventory control system, which monitors the removal and replacement of objects, and identifying objects removed and returned to the system.

BACKGROUND

When tools are used in a manufacturing or service environment, it is important that tools be returned to a storage unit, such as a tool box, after use. Employers typically perform a manual inventory check of the tool box to minimize or eliminate the problem of misplacement or theft of expensive tools. Companies can conduct random audits of employee's toolbox to prevent theft and monitor tool location.

Some industries have high standards for inventory control of tools, for preventing incidents of leaving tools in the workplace environment where they could cause severe damage. For the aerospace industry, it is important to ensure that no tools are accidentally left behind in an aircraft or missile being manufactured, assembled or repaired. The Aerospace Industries Association even establishes a standard called National Aerospace Standard including recommended procedures, personnel management and operations to reduce foreign object damage (FOD) to aerospace products. FOD is defined as any object not structurally part of the aircraft. The most common foreign objects found are nuts, bolts, safety wire, and hand tools. Inventory control over tools is critical to prevent tools from being left in an aircraft.

Some toolboxes include built-in inventory determination features to track inventory conditions of tools stored in those toolboxes. For example, some toolboxes dispose contact sensors, magnetic sensors or infrared sensors in or next to each tool storage locations, to detect whether a tool is placed in each tool storage location. Based on signals generated by the sensors, the toolboxes are able to determine whether any tools are missing. While this type of inventory check may be useful to some extent, it suffers from various drawbacks. For instance, if a sensor detects that something is occupying a storage location, the toolbox will determine that no tool is missing from that storage location. However, the toolbox does not know whether the right kind of tool is indeed placed back in the toolbox or it is just some objects placed in the storage location to cheat the system. Furthermore, disposing sensors for numerous storage locations in a toolbox is tedious and costly, and the large number of sensors is prone to damages or malfunctions which will produce false negative or positive alarms.

Accordingly, there is a need for an effective inventory control system to assist tracking and accounting for usage of tools, and whether they are properly put back after usage. To address these issues, automated tool control systems have been developed which determine an inventory condition of objects by capturing and processing images of storage locations that are used to store the objects. Such an exemplary tool storage system is described in U.S. patent application Ser. No. 12/484,127, filed Jun. 12, 2009, the entire disclosure of which is hereby incorporated by reference in its entirety.

An exemplary image-based tool storage system includes multiple storage drawers, each storage drawer including multiple storage locations for storing various types of tools. More particularly, each storage drawer includes a foam layer having a plurality of storage locations, such as tool cutouts, for storing tools. Each cutout is specifically contoured and shaped for fittingly receiving a tool with corresponding shapes. Typically, the system is "trained" to recognize the tools in a drawer by having an image sensor (i.e., a camera) image the entire drawer to create a data file, which is processed to provide positional information for all the specific tools in the drawer.

There is a need for an imaging based inventory control system which simplifies the tool training process required to store tool identification parameters for a single tool or group of tools, rather than reacquiring and storing the tool parameters for every tool in the drawer or tray.

There is also a need for reducing the current process time required to create foam layouts, and to check, approve and produce the foam layers. Further, there is a need to automate the foam changeout process and the associated updating of the system database, to avoid errors resulting from manually entering tool data.

SUMMARY

The teachings herein improve over conventional tool control systems by providing improved systems and methods for tool training and database updating.

According to the present disclosure, the foregoing and other advantages are achieved in part by an inventory control system for determining an inventory condition of objects stored in the system, comprising a storage container including a plurality of storage locations for storing objects; an image sensing device configured to capture image data of the container, including image data of all of the plurality of storage locations and of a target area of the container that includes an individual object storage location comprising less than the plurality of storage locations; a data storage device for storing the image data of the container; and a data processor. The data processor is configured to receive initial image data representing an initial image of the plurality of storage locations, receive image data representing an image of the target area captured subsequent to the initial image; modify the initial image data based on the image data of the target area to generate adjusted image data; and store the adjusted image data in the data storage device.

In accord with another aspect of the disclosure, a method comprises receiving, in an inventory control system having a storage container including a plurality of storage locations for storing objects, selection of a target area of the container that includes an individual object storage location comprising less than the plurality of storage locations; capturing initial image data representing an initial image of the plurality of storage locations; capturing image data representing an image of the target area subsequent to the initial image; modifying the initial image data based on the image data of the target area to generate adjusted image data; and storing the adjusted image data.

In accord with yet another aspect of the disclosure, an inventory control system for determining an inventory condition of objects stored in the system comprises a storage container including a plurality of storage locations for storing objects; an image sensing device configured to capture image data of the container, including image data of the plurality of storage locations; and a data processor. The data processor is configured to receive image data representing objects disposed on a surface of the storage container, generate a data file defining the shape and position of each of the objects in the storage container based on the received image data, and generate a layout of the plurality of storage locations usable for producing a storage layer for controlling the objects while they are stored in the container, based on the generated data file.

According to a further aspect of the disclosure, a method comprises receiving, in an inventory control system having a storage container including a plurality of storage locations for storing objects, image data representing objects disposed on a surface of the storage container, generating a data file defining the shape and position of each of the objects in the storage container based on the received image data, and generating a layout of the plurality of storage locations usable for producing a storage layer for controlling the objects while they are stored in the container, based on the generated data file.

According to a still further aspect of the disclosure, an inventory control system for determining an inventory condition of objects stored in the system comprises a storage container including a plurality of storage locations for storing objects; an image sensing device configured to capture image data of the container; a data storage device for storing the image data and other data related to the container; and a data processor. The data processor is configured to receive new data representing objects in the plurality of storage locations; and update the image data and the other data related to the container stored in the storage device based on the received new data.

According to yet another aspect of the disclosure, a method comprises storing, in an inventory control system having a storage container including a plurality of storage locations for storing objects, image data and other data related to the container; receiving new data representing objects in the plurality of storage locations; and updating the image data and the other data related to the container stored in the storage device based on the received new data.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein:

FIG. 4D illustrates how an exemplary image is stitched together;

FIGS. 5A and 5B are exemplary identifier designs for use in this disclosure;

FIGS. 6A-6C illustrate an example of timed image capturing;

FIGS. 9A-9D are illustrative images of an exemplary audit record and images taken during access to an exemplary system according to this disclosure;

FIGS. 14 and 15 illustrate functional block diagram illustrations of general purpose computer hardware platforms.

DETAILED DESCRIPTION

Figure 1A:
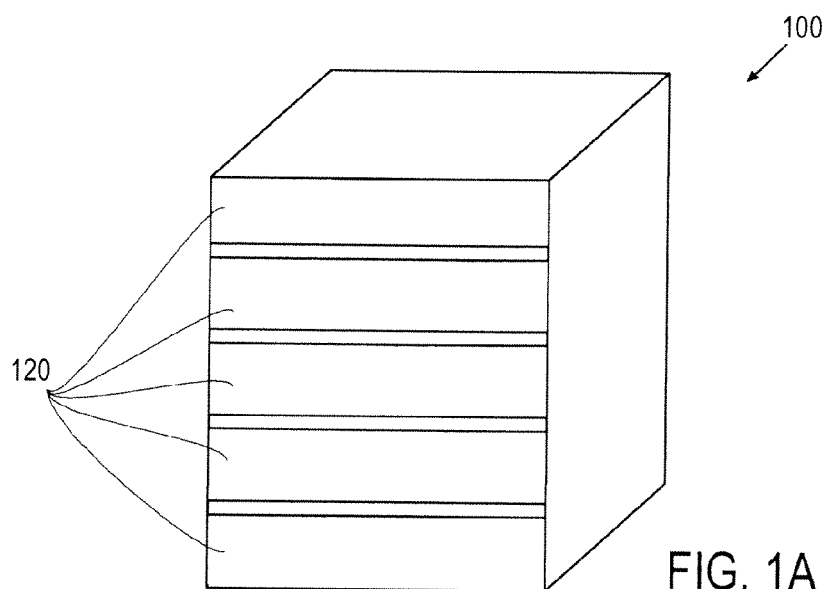
FIGS. 1a and 1b show exemplary storage units in which implementations according to this disclosure may be implemented.

In the following description, for the purposes of explanation, numerous specific details are set forth in order to provide a thorough understanding of the present disclosure. Specifically, operations of illustrative implementations that utilize machine vision to identify inventory conditions of a storage unit are described in the context of tool management and tool inventory control. It will be apparent, however, to one skilled in the art that concepts of the disclosure may be practiced or implemented without these specific details. Similar concepts may be utilized in other types of inventory control systems such as warehouse management, jewelry inventory management, sensitive or controlled substance management, mini bar inventory management, drug management, vault or security box management, etc. In other instances, well-known structures and devices are shown in block diagram form in order to avoid unnecessarily obscuring the present disclosure.

The disclosed techniques simplify the tool training process required to store tool identification parameters for a single tool or group of tools, rather than reacquiring and storing the tool parameters for every tool in the drawer or tray. This process reduces time spent processing tool data while re-training drawers or trays, especially those drawers or trays in which there are a large number of tools.

Also, to group tools together for specific job requirements, or as a kit of similar or identical tools, a technique is disclosed to subdivide the foam layouts with cutouts for specific tools into pallets. The pallets can be issued from the tool storage unit as a whole with all the kitted tools included therein, or individual tools can be issued and returned while the pallet remains in the tool storage device.

Another improvement disclosed herein relates to the creation of the foam layers with cutout silhouettes used to store each individual tool. Currently the sales associate and the customer define the tool list required for inclusion in each tool control system. There are multiple methods to create the tool silhouettes and transfer them to the foam layout to create a tool storage foam layer for the tool storage device drawers or trays. Silhouettes can be created by CAD specialists using 2D engineering drawings, 3D engineering models, direct measurement of the tool, flat bed scanning of the tool, and backlight scanning of the tool. Once the tool silhouettes are created the CAD specialists create the layout of each drawer or tray per customer requirements and standardized rules. The finished layout is sent to the customer for approval. The drawer or tray layout is then revised or sent to the foam vendor for production if approved.

This process is opened ended and can result in long delays from initial silhouette collection to production, especially if the customer changes their mind. An improved method to create the foam silhouettes is disclosed herein which utilizes the camera based tool control system to photograph the tools in the layout proposed by the customer at their site, automatically correct the image to remove parallax, automatically create the images of the layout for checking, assign part numbers to each tool, and automatically create the production ready file for the waterjet or other CAD/CAM production machine. This process significantly reduces the current process time required to create foam layouts, check, approve and produce from weeks to days.

An additional way to increase efficiencies for image based tool control systems in the manufacturing, maintenance and service process is to automate the foam change out process. The current process requires the user or administrator to download an electronic .txt file which describes the areas of interest for the cameras to view in each individual drawer or tray. Once these files are loaded the user initiates the camera calibration routine in the manufacturing application. The user must then manually step through each step in the camera calibration and drawer or tray training routines to complete the foam layer change out process. This disclosure describes an automated process wherein the drawer or tray file is downloaded to the proper storage location and the user invokes the foam change out routine from the tool storage devices GUI screen. The foam change out routine then automatically steps the user through each step required to complete foam layout changes.

With this overview, reference now is made in detail to the examples illustrated in the accompanying drawings and discussed below.

Overview of Exemplary Tool Storage Systems

Figure 1B:
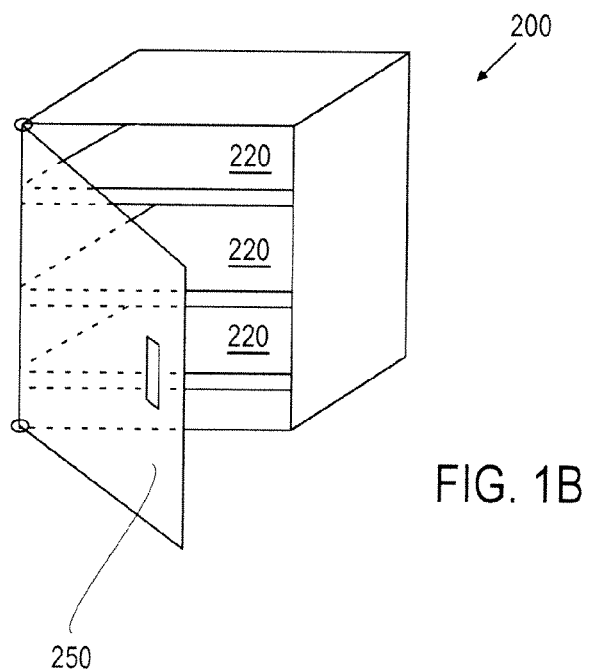

FIGS. 1a and 1b show exemplary storage units in which inventory control systems according to this disclosure may be implemented. FIG. 1a is an exemplary tool storage system 100 including multiple storage drawers 120. Each storage drawer 120 includes multiple storage locations for storing various types of tools. As used throughout this disclosure, a storage location is a location in a storage system for storing or securing objects. In one implementation, each tool has a specific pre-designated storage location in the tool storage system.

Each storage drawer operates between a close mode, which allows no access to the contents of the drawer, and an open mode, which allows partial or complete access to the contents of the drawer. When a storage drawer moves from a close mode to an open mode, the storage drawer allows increasing access to its contents. On the other hand, if a storage moves from an open mode to a close mode, the storage drawer allows decreasing access to its contents. As shown in FIG. 1a, all storage drawers 120 are in close mode.

A locking device may be used to control access to the contents of the drawers 120. Each individual drawer 120 may have its own lock or multiple storage drawers 120 may share a common locking device. Only authenticated or authorized users are able to access to the contents of the drawers.

The storage drawers may have different sizes, shapes, layouts and arrangements. FIG. 1b shows another type of tool storage system 200 which includes multiple storage shelves or compartments 220 and a single door 250 securing access to the storage shelves 250. The storage shelves or compartments may come in different sizes, shapes, layouts and arrangements.

Figure 2:
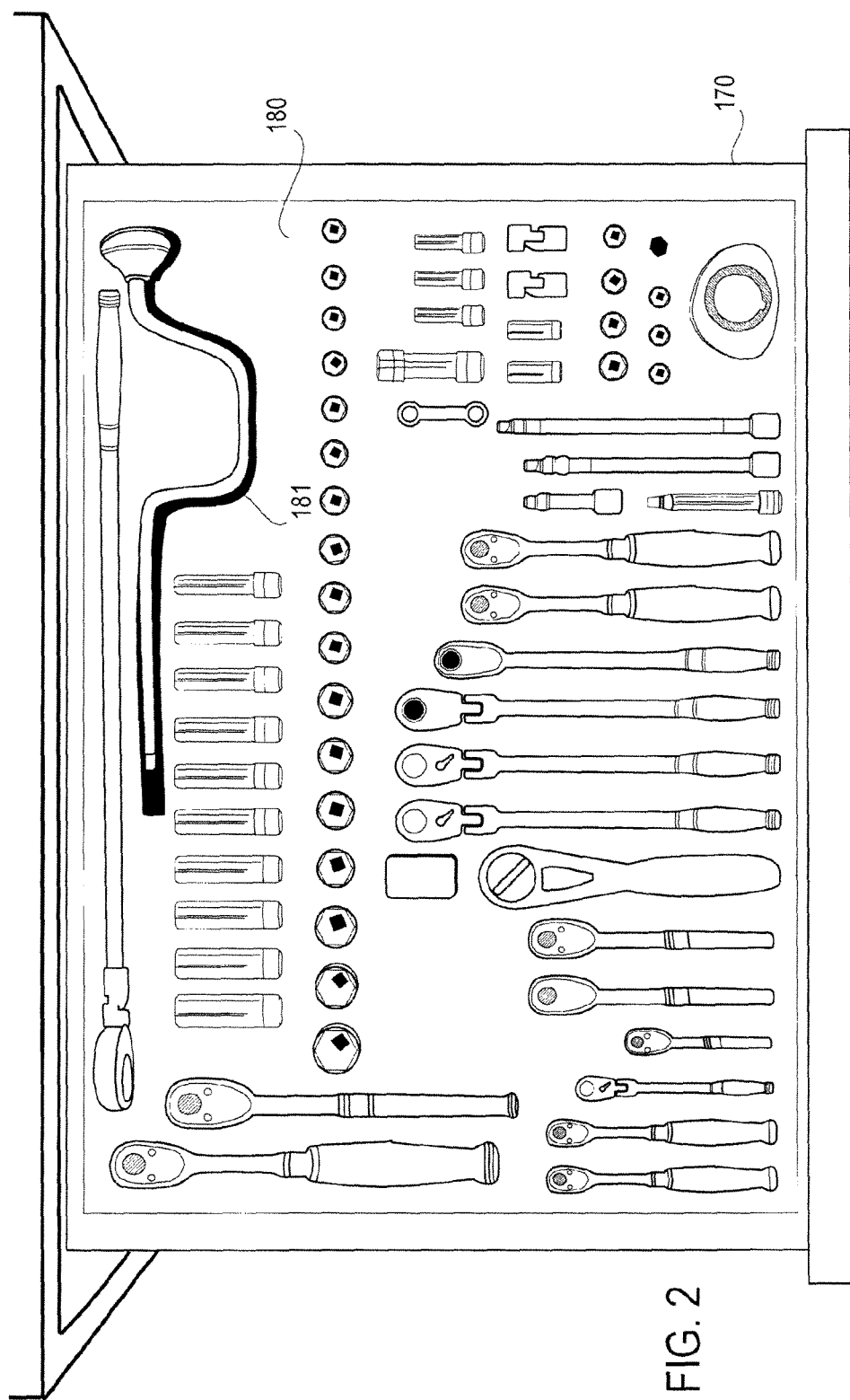
FIG. 2 shows details inside an exemplary storage drawer operated in the open mode.

FIG. 2 shows details inside an exemplary storage drawer 120 in the open mode. Each storage drawer 120 includes a foam base 180 having at least one storage location, such as cutouts 181, for storing tools. Each cutout is specifically contoured and shaped for fittingly receiving a tool with corresponding shapes. Tools may be secured in each storage location by using hooks, Velcro, latches, pressures from the foam, etc.

Figure 3:
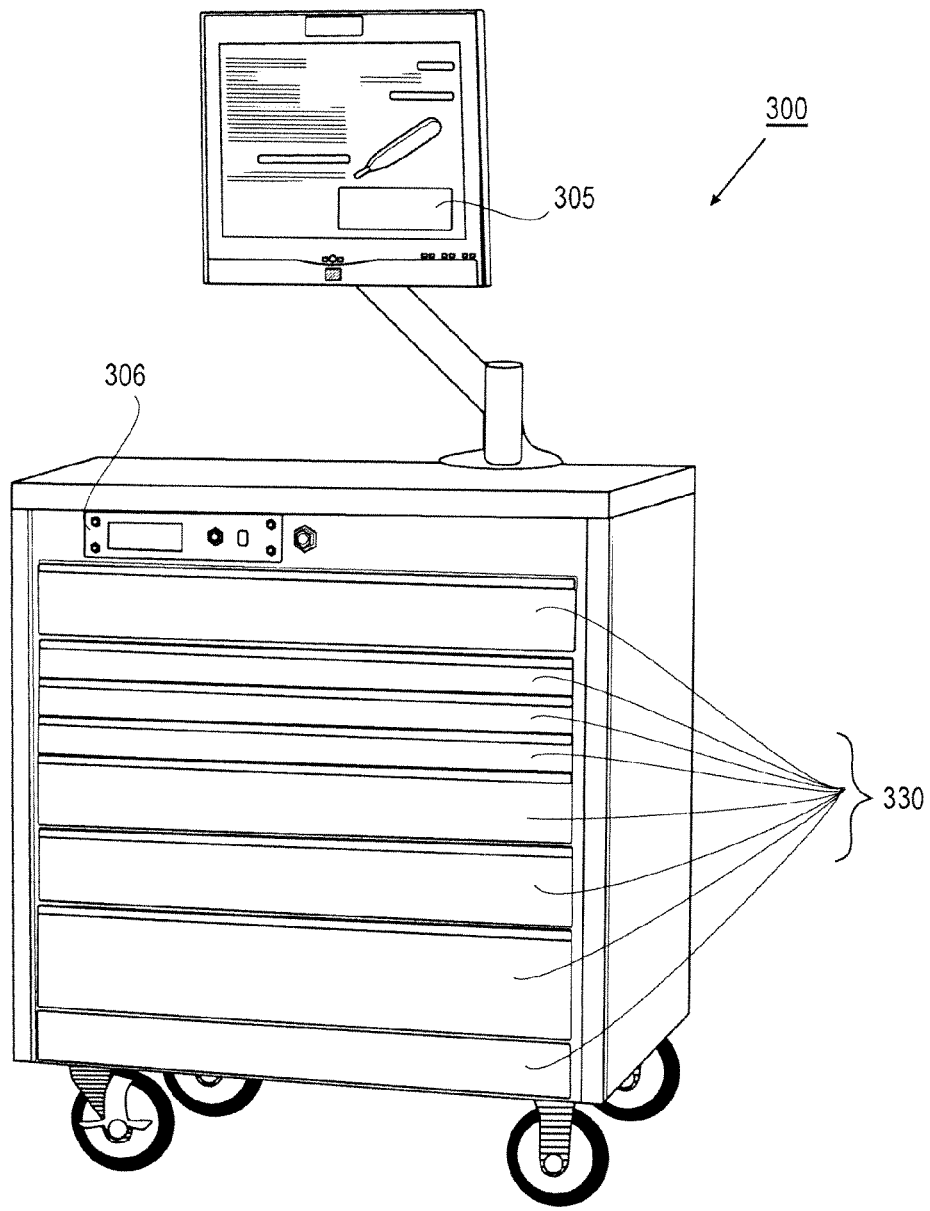
FIG. 3 shows an exemplary tool storage system according to this disclosure.

FIG. 3 shows an exemplary inventory control system implemented as a tool storage system 300 according to this disclosure for storing tools. Storage system 300 includes a display 305, an access control device 306, such as a card reader, for verifying identity and authorization levels of a user intending to access storage system 300, multiple tool storage drawers 330 for storing tools. Tool storage system 300 includes an image sensing device configured to capture images of contents or storage locations of the system. The image sensing device may be lens-based cameras, CCD cameras, CMOS cameras, video cameras, or any type of device that captures images. System 300 includes a data processing system, such as a computer, for processing images captured by the image sensing device. Images captured or formed by the image sensing device are processed by the data processing system for determining an inventory condition of the system or each storage drawer. The term inventory condition as used throughout this disclosure means information relating to an existence or non-existence condition of objects.

The data processing system may be part of tool storage system 300. In one implementation, the data processing system is a remote computer having a data link, such as a wired or wireless link, coupled to tool storage system 300; or a combination of a computer integrated in storage system 300 and a computer remote to storage system 300. Detailed operations for forming images and determining inventory conditions will be discussed shortly.

Drawers 330 are similar to those drawers 120 shown in FIG. 1a. Display 305 is an input and/or output device of storage system 330, configured to output information. Information entry via display 305 is possible such as by using a touch screen display. Access control device 306 is used to limit access to tool storage drawers 330 to authorized users only. Access control device 306, through the use of one or more locking devices, keeps all storage drawers 330 locked in a closed position until access control device 306 authenticates a user's authorization for accessing storage system 300. Access control device 306 may use one or more access authentication means to verify a user's authorization levels, such as by using a key pad to enter an access code, a keycard reader to read from a key card or fobs authorization level of a user holding the card or fob, biometric methods such as fingerprint readers or retinal scans, or other methods. If access control device 306 determines that a user is authorized to access storage system 300, it unlocks some or all storage drawers 330, depending on the user's authorization level, allowing the user to remove or replace tools. In one implementation, access to each storage drawer 300 is controlled and granted independently. Based on an assigned authorization or access level, a user may be granted access to one or more drawers of system 300, but not to other drawers. In one implementation, access control device 306 relocks a storage drawer 330 when or after a user closes the drawer.

The location of access control device 306 is not limited to the front of storage system 300. It could be disposed on the top of the system or on a side surface of the system. In one implementation, access control device 306 is integrated with display 305. User information for authentication purpose may be input through display device with touch screen functions, face detection cameras, fingerprint readers, retinal scanners or any other types of devices used for verifying a user's authorization to access storage system 300.

Figure 4A:
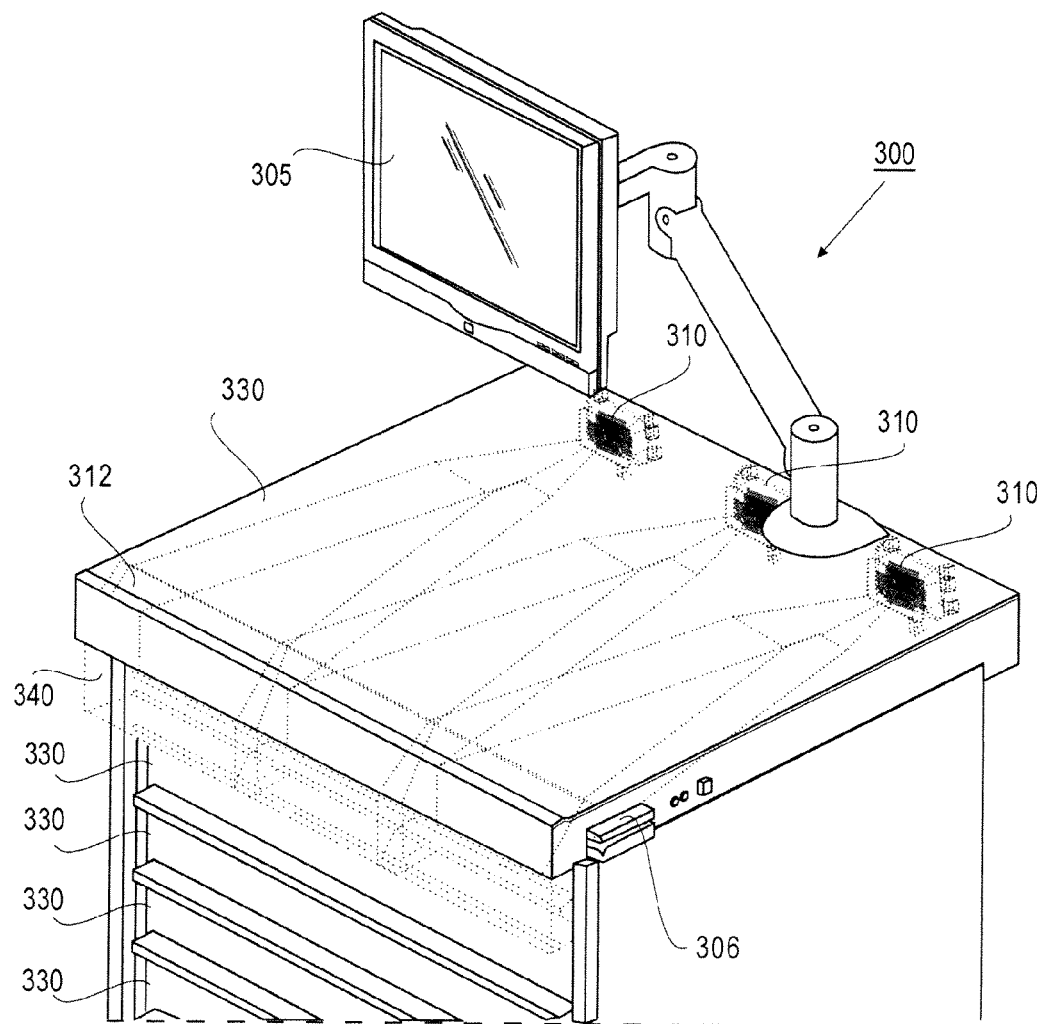
FIGS. 4A-4C and 4E are different views of the tool storage system shown in FIG. 3.
Figure 4B:
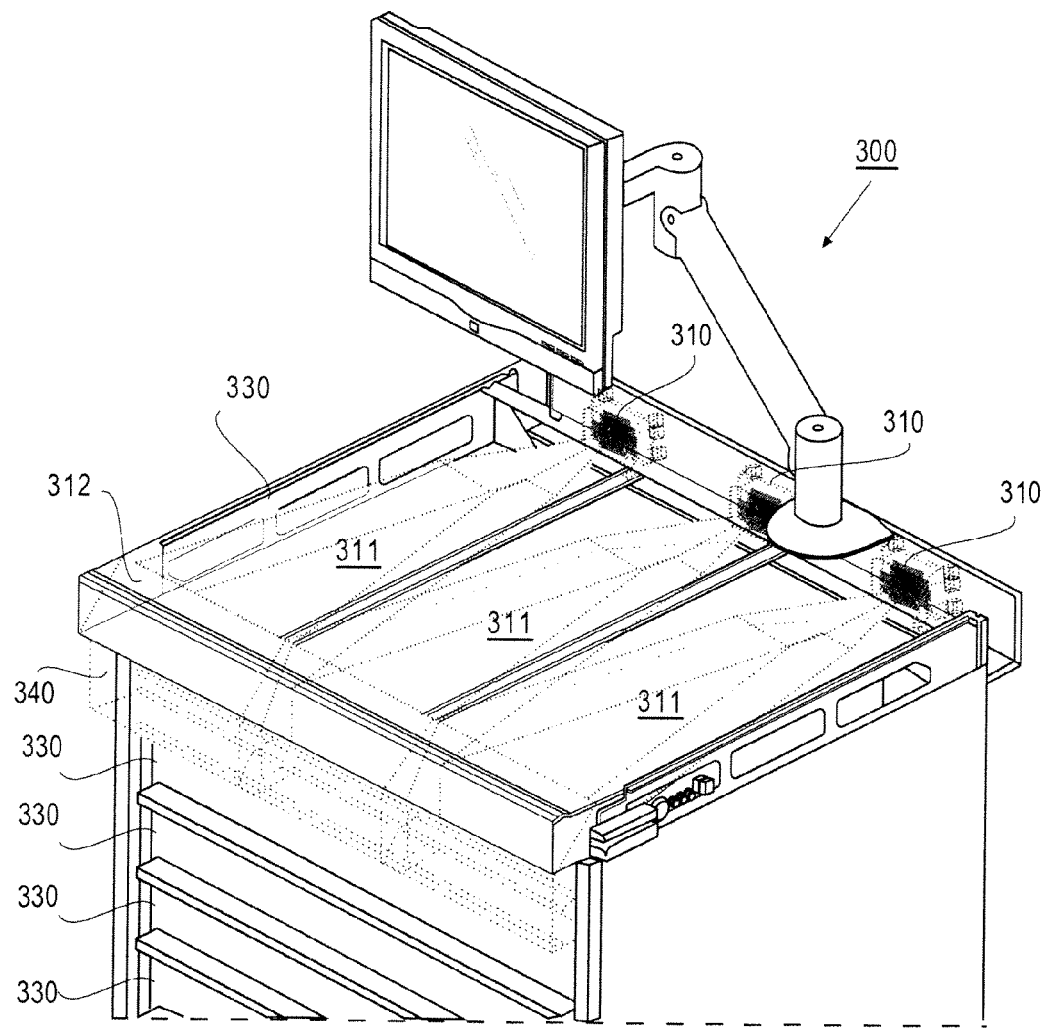

FIGS. 4a and 4b show a partial perspective view of tool storage system 300. As illustrated in FIG. 4a, an access control device 306 in the form of a card reader is disposed on a side surface of the system. Storage system 300 includes an imaging compartment 330 which houses an image sensing device comprising three cameras 310 and a light directing device, such as a mirror 312 having a reflection surface disposed at about 45 degrees downwardly relative to a vertical surface, for directing light reflected from drawers 330 to cameras 310. The directed light, after arriving to cameras 310, allow cameras 310 to form images of drawers 330. The shaded area 340 below mirror 312 represents a viewing field of the imaging sensing device of tool storage system 300. Minor 312 has a width equal to or larger than that of each storage drawer, and redirects the camera view downwards toward the drawers. FIG. 4e is an illustrative side view of system 300 showing the relative position between cameras 310, mirror 312 and drawers 330. Light L reflected from any of drawers 330 to minor 312 is directed to cameras 310.

FIG. 4b is a perspective view identical to FIG. 4a except that a cover of imaging compartment 330 is removed to reveal details of the design. Each camera 310 is associated with a viewing field 311. As shown in FIG. 4b, the combined viewing fields of cameras 310 form the viewing field 340 of the image sensing device. Viewing field 340 has a depth of x. For instance, the depth of viewing field 340 may be approximately 2 inches.

Figure 4C:
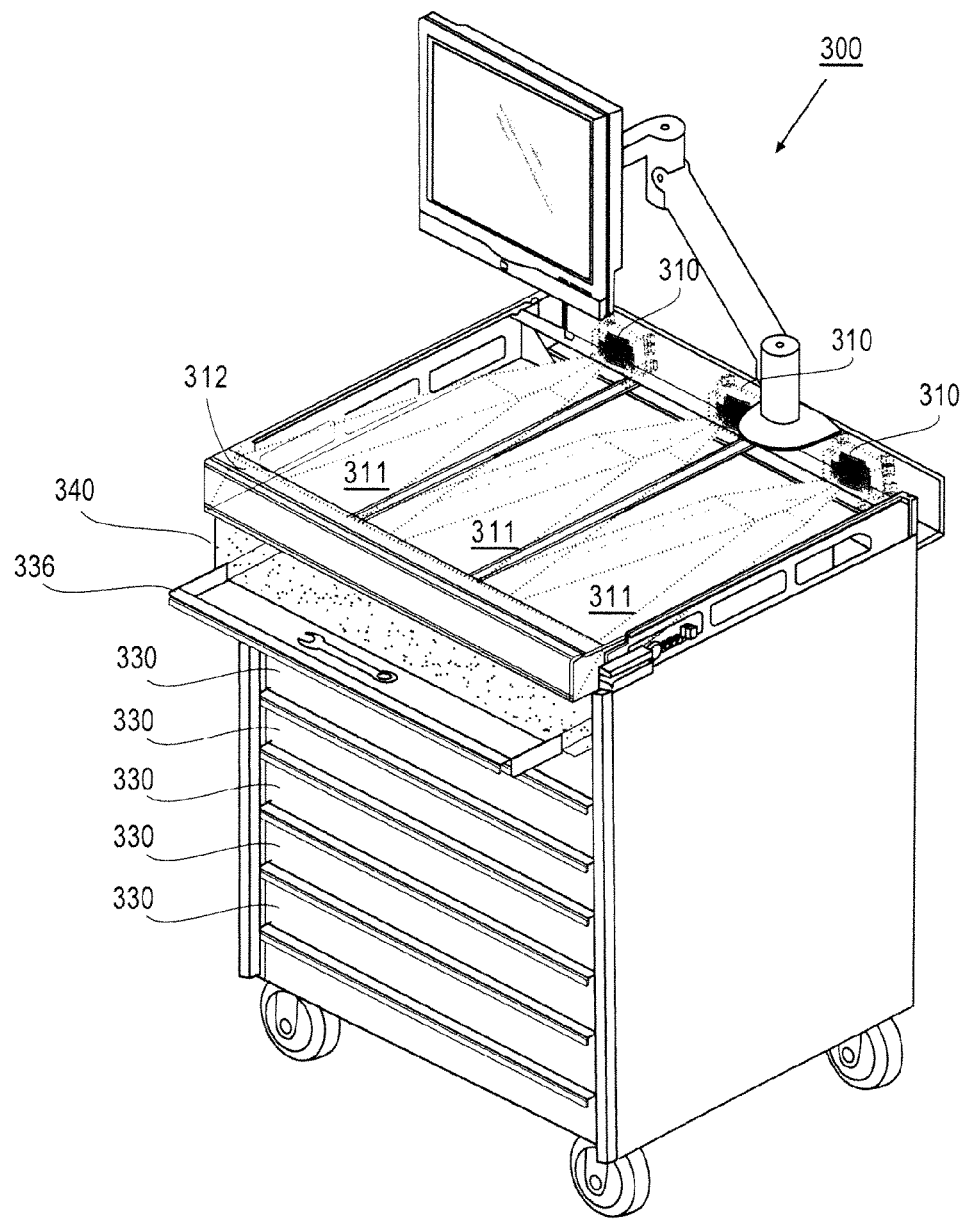
Figure 4E:
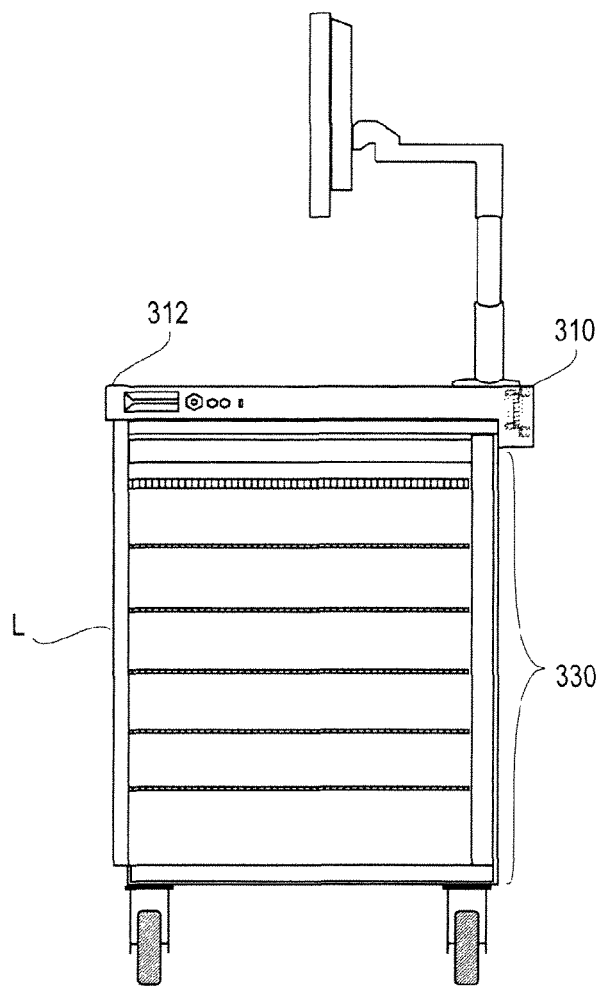

FIG. 4c is an alternative perspective view of tool storage system 300 shown in FIG. 4a, except that a storage drawer 336 now operates in an open mode allowing partial access to its contents or storage locations in storage drawer 336.

This arrangement of cameras 310 and mirror 312 in FIGS. 4a-4c allows cameras 310 the capability of capturing images from the top drawer to the bottom drawer, without the need to substantially change its focal length.

In one implementation, cameras 310 capture multiple partial images of each storage drawer as it is opened or closed. Each image captured by cameras 310 may be associated with a unique ID or a time stamp indicating the time when the image was captured. Acquisition of the images is controlled by a data processor in tool storage system 300. In one implementation, the captured images are the full width of the drawer but only approximately 2 inches in depth. The captured images overlap somewhat in depth and/or in width. As shown in FIG. 4D, the partial images 41-45 taken by different cameras 310 at different points in time may be stitched together to form a single image of partial or entire drawer and its contents and/or storage locations. This stitching may be performed by the data processor or by an attached or remote computer using off-the-shelf software programs. Since images are captured in approximately two inch slices multiple image slices are captured by each camera. One or more visible scales may be included in each drawer. The processor may monitor the portion of the image that contains the scale in a fast imaging mode similar to video monitoring. When the scale reaches a specified or calculated position, the data processing system controls the image sensing device to capture and record an image slice. The scale may also assist in photo stitching. Additionally a pattern such as a grid may be applied to the surface the drawer. The pattern could be used to assist the stitching or image capture process.

In another implementation, the image sensing device includes larger mirrors and cameras with wide angle lens, in order to create a deeper view field x, such that the need for image stitching can be reduced or entirely eliminated.

In one implementation, one or more line scan cameras are used to implement the image sensing device. A line scan camera captures an image in essentially one dimension. The image will have a significant width depending on the sensor, but the depth is only one pixel. A line scan camera captures an image stripe the width of the tool drawer but only one pixel deep. Every time drawer 330 moves by a predetermined partial amount the camera will capture another image stripe. In this case the image stripes must be stitched together to create a usable full drawer image. This is the same process used in many copy machines to capture an image of the document. The document moves across a line scan camera and the multiple image stripes are stitched together to create an image of the entire document.

In addition to a mirror, it is understood that other devices, such as prisms, a combination of different types of lens including flat, concave, and/or convex, fiber optics, or any devices may direct light from one point to another may be used to implement the light directing device for directing light coming from an object to a remote camera. Another option could be the use of fiber optics. The use of light directing device may introduce distortions into the captured images. Calibrations or image processing may be performed to eliminate the distortions. For instance, cameras 310 may first view a known simple grid pattern reflected by the light directing device and create a distortion map for use by the data process processor to adjust the captured image to compensate for minor distortion.

For better image capture and processing, it may be desirable to calibrate the cameras. The cameras may include certain build variations with respect to image distortion or focal length. The cameras can be calibrated to reduce distortion in a manner similar to how the minor distortion can be reduced. In fact, the mirror calibration could compensate for both camera and minor distortion, and it may be the only distortion correction used. Further, each individual cameras may be calibrated using a special fixture to determine the actual focal length of their lenses, and software can be used to compensate for the differences from camera to camera in a single system.

In one implementation, the image sensing device does not include any mirror. Rather, one or more cameras are disposed at the location where mirror 312 was disposed. In this case, the cameras point directly down at storage drawers 330 when then move. In another implementation, each storage drawer 330 has one or more associated cameras for capturing images for that storage drawer.

Determination of Inventory Conditions

System 300 determines the presence or absence of tools in drawers 330 based on captured images using a variety of possible strategies. Suitable software may be executed by the embedded processor or an attached computer (PC) for performing inventory determinations based on captured images.

In one example, system 300 determines an inventory condition of a storage drawer based on empty locations in the drawer. Each storage location in the drawer is configured to store a pre-designated object, such as a pre-designated tool. A non-volatile memory device of system 300 stores information identifying a relationship between each known storage location in the drawer and its corresponding pre-designated object. The memory device also stores information of two baseline images of the drawer: one baseline image having each of its storage locations occupied by the corresponding pre-designated object, and another baseline image having its storage locations unoccupied. In determining an inventory condition of the drawer, the data processor compares an image of the drawer and each of the baseline images. Based on a difference of the images, the data processor determines which storage location in the drawer is not occupied by its corresponding pre-designated object. The identity of the missing object is determined based on the stored relationship identifying each storage locations and their corresponding pre-designated objects.

Another implementation according to this disclosure utilizes specially designed identifier for determining an inventory condition of objects. Depending on whether a storage location is being occupied by an object, an associated identifier appears in one of two different manners in an image captured by the image sensing device. For instance, an identifier may appear in a first color when the associated storage location is occupied by a tool and a second color when the associated storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

FIG. 5 shows an implementation of identifier designs. As shown in FIG. 5, storage location 51 is designated to store tool 510, and storage location 52 is currently occupied by its designated tool 520. Storage location 53 is not occupied by its designated tool. Each storage location 51, 52, 53 has an associated identifier. Depending on whether each storage location 51-53 is being occupied by a corresponding tool, each identifier appears in an image captured by cameras 310 in one of two different manners. For example, each identifier may not be viewable by cameras 310 when a corresponding tool is stored in the respective storage location, and becomes viewable by cameras 310 when an object is not stored in the respective storage location. Similarly, a different implementation may have an identifier viewable by the image sensing device when an object is stored in the respective storage location, and is not viewable by the image sensing device when an object is not stored in the respective storage location.

For instance, the bottom of storage locations 51-53 includes an identifier made of retro-reflective material. Since storage locations 51 and 53 are not occupied by their respective designated tools, their associated identifiers 511 and 513 are viewable to the image sensing device. On the other hand, storage location 52 is currently occupied by its designated tool, its identifier is blocked from the view of the image sensing device. When the particular tool is stored in the storage location, the identifier is blocked from the view of the image sensing device and not viewable by the image sensing device. On the other hand, if the storage location is not occupied by the particular tool, the identifier is viewable by the image sensing device and shows up as a high intensity area on an image of the drawer. Accordingly, a high intensity area represents a missing tool. The system 300 detects locations with missing tools and correlates the empty locations with stored relationship identifying each storage locations and their corresponding tools. The system 300 determines which tools are not in their specified locations in a drawer. It is understood that the identifiers may be implemented in many different manners. For instance, the identifiers may be designed to create a high intensity image when a storage location is occupied and an image with less intensity when the storage location is occupied.

In one implementation, each identifier is implemented with a contact sensor and an LED. As shown in FIG. 5b, storage location 61 is associated with a contact sensor 62 and an LED 63. When contact sensor 61 senses a tool is in storage location 61, a signal is generated by contact sensor 61 and controls to turn off power supply to LED 63. On the other hand, if contact sensor 62 detects that a tool is not in storage location 61, control sensor 62 generates a control signal which controls to turn on LED 63, which creates a high intensity area in an image captured by the image sensing device. Each high intensity area in an image indicates a storage location without an associated tool. The system 300 identifies removed or missing tools by determining which storage locations are not occupied by tools and pre-stored information identifying corresponding tools of the locations. In still another implementation, the identifier is unique to the pre-designated tool stored in each respective storage location. The data processor is configured to determine an inventory condition by evaluating whether at least one viewable identifier exists in an image of the storage locations captured by the image sensing device, and pre-stored relationship between each pre-designated object and a respective identifier unique to each pre-designated object.

In still another implementation, an identifier associated with a storage location creates a high intensity image when the storage location is occupied, and a lower intensity image when the storage location is unoccupied. The system 300 determines which tools exist based on detected identifiers and pre-stored information identifying a relationship between each storage location and the corresponding pre-designated object. In another implementation, the identifier is unique to a pre-designated object stored in each respective storage location. The system 300 determines an inventory condition of existing objects by evaluating identifiers that exist in an image of the storage locations captured by the image sensing device, and pre-stored relationship between each pre-designated object and a respective identifier unique to each pre-designated object.

In still another implementation, each object stored in the system 300 includes an attached identifier unique to each object. The data processor has access to prestored information identifying each tool stored in the system and known information identifying a relationship between each object and a respective identifier unique to each pre-designated object. The data processor determines an inventory condition of objects by evaluating identifiers that exist in an image of the storage locations captured by the image sensing device, and the relationship between each pre-designated object and a respective identifier unique to each pre-designated object. For instance, system 300 stores a list of tools stored in the system and their corresponding unique identifiers. After cameras 310 captures an image of a storage drawer, the data processor determines which identifier or identifiers are in the image. By comparing the identifiers appearing in the image with list of tools and their corresponding unique identifiers, the data processor determines which tools are in the system and which ones are not.

As discussed earlier, identifiers associated with the storage locations may be used to determine which locations have missing objects. According to one implementation, system 300 does not need to know the relationship between each storage location and the corresponding object. Rather, each identifier is unique to a corresponding object stored in the storage location. The data processor of system 300 has access to pre-stored information identifying a relationship between each identifier and the corresponding object, and information identifying each object. In other words, system 300 has access to an inventory list of every object stored in system 300 and its respective unique identifier. When an empty tool storage location is detected by system 300, the corresponding identifier is extracted from the image and decoded by system software. As each identifier is unique to a corresponding object, system 300 is able to determine which object is missing by checking the relationship between each identifier and the corresponding object, and the inventory list of objects. Each identifier unique to an object stored in a storage location may be disposed next to the storage location or in the storage location. In one implementation, the identifier is disposed next to the storage location and is always viewable to the image sensing device no matter whether the location is occupied by an object or not. In another implementation, when an identifier is disposed in the corresponding location, the identifier is not viewable to the image sensing device when the location is occupied by an object, and is viewable to the image sensing device when the location is not occupied by an object.

An implementation of this disclosure utilizes combinations of baseline images and identifiers unique to objects to determine an inventory status. For example, a baseline image may include information of a storage drawer with all storage locations occupied with their respective corresponding objects, wherein each storage location is associated with an identifier unique to an object stored in the storage location. An inventory condition is determined by comparing an image of the storage locations and the baseline image, to determine which locations are occupied by objects and/or which locations have missing objects. Identifications of the missing objects are determined by identifying the identifier associated with each storage location with missing object.

Another implementation of this disclosure utilizes unique combinations of identifiers to determine an inventory status. For instance, each storage location may have a first type of identifier disposed in the location and a second type of identifier unique to an object stored in the storage location and disposed next to the storage location. The first type of identifier is viewable to an image sensing device when the location is not occupied by an object and not viewable by an image sensing device when the location is occupied by an object. The first type of identifier may be made of retroreflective material. If a storage location is not occupied by an object corresponding to the storage location, the identifier of the first type is viewable by the image sensing device and shows up as a high intensity area. Accordingly, each high intensity area represents a missing object, which allows system 300 to determine which locations having missing objects. Based on identifiers of the second type associated with those locations with missing objects, system 300 identifies which objects are missing from system 300. Consequently, an inventory condition of system 300 is determined.

According to still another implementation, system 300 uses image recognition methods to identify an object missing from system 300. System 300 has access to an inventory list indicating which tools are stored in each drawer or system 300. However, system 300 does not have to know where the tools are stored. The tools are placed in foam cutout locations specific for each tool. Using characteristics such as size, shape, color, and other parameters image recognition software identifies each tool in the drawer. Missing tools are simply the tools on the inventory list that are not identified as being in the drawer.

System 300 records access information related to each access. The access information includes time, user information related to the access, duration, user images, images of storage locations, identities of storage units or contents of the storage system, objects in the storage system, etc., or any combinations thereof. In one implementation, system 300 includes a user camera that captures and stores image of the person accessing storage system 300 each time access is authorized. For each access by a user, system 300 determines an inventory condition and generates a report including associating the determined inventory condition with access information.

Timed Image Capturing

Implementations of this disclosure utilize uniquely timed machine imaging to capture images of system 300 and determine an inventory condition of system 300 according to the captured images. In one implementation, system 300 activates or times imaging of a storage drawer based on drawer locations and/or movements, in order to create efficient and effective images. For instance, a data processor of the system 300 uses drawer positions to determine when to take overlapping partial images as discussed relative to FIGS. 4a-4e, to assure full coverage of a drawer being accessed by a user. In another example, drawer position information may be useful to the stitching software in the construction of a full drawer image. Drawer position information may be used to help locate the positions of the cutouts in the drawer.

In one implementation, the data processor of system 300 controls the image sensing device to form images of a drawer based on a pre-specified manner of movement by the drawer. For instance, for each access, system 300 only takes images of the drawer when it is moving in a specified manner or in a predetermined direction. According to one implementation, the image sensing device takes images when a drawer is moving in a direction that allows decreasing access to its contents or after the drawer stops moving in the direction allowing decreasing access to its contents. For example, cameras may be controlled to take pictures of drawers when a user is closing a drawer, when or after a drawer stops moving in a closing direction or when the drawer is completely closed. In one implementation, no images are taken when the drawer is moving in a direction allowing increasing access to its contents, such as when a drawer moves from a close position to an open position.

FIG. 6 shows an operation of this implementation in the setting of an exemplary system described in FIGS. 4a-4d. As shown in FIG. 6a, a user partially opens drawer 330 to expose storage locations in shaded area 331. Since the user only opens drawer 330 half way, the user has no access to storage locations in area 336. After the user finds the tool he needs from area 331, the user starts to close drawer 330 (FIG. 6b). When sensors in system 300 detect the closing movement of drawer 330, which allows decreasing access to contents, the data processor activates the image sensing device, such as cameras 310, to capture partial images of shaded area 331 until drawer 330 is fully closed (FIG. 6c).

Since the user never has any access to area 336, it is safe to assume that an inventory condition relative to area 336 remains unchanged from the previous access. However, for area 331, since the user had access to that area, an inventory associated with that area needs to be updated. Any changes in access or replacement of tools would occur only in area 331. Therefore, system 300 determines an inventory condition of drawer 330 associated with the access by the user based on the captured image covering area 331 and inventory information related to area 336 of a previous access, the information of which may be retrieved from a non-volatile memory device of system 300 that stores inventory information associated with each access to system 300. The determined inventory condition for drawer 330 is then stored in the non-volatile memory device. In one implementation, the non-volatile memory device stores an initial inventory condition of drawer 300 which represents a baseline inventory condition with which later inventory conditions may compare. For instance, after each auditing of tool inventory condition, system 300 stores the inventory condition after the audit as the baseline inventory condition.

Locations, movements and moving directions of each storage drawer may be determined by using sensors to measure location or movement sensors relative to time. For instance, location information relative to two points in time may be used to derive a vector indicating a moving direction.

Examples of sensors for detecting a position, movement or moving direction of storage drawers include a sensor or encoder attached to a drawer to detect its position relative to the frame of system 300; a non-contact distance measuring sensor for determining drawer movement relative to some position on the frame of the system 300, such as the back of the system 300; etc. Non-contact sensors may include optical or ultrasonic sensors. A visible scale or indicator viewable by cameras 310 may be included in each drawer, such that camera 210 could read the scale to determine drawer position.

A change in an inventory condition, such as removal of tools, occurring in the current access may be determined by comparing inventory conditions of the current access and the access immediately before the current access. If one or more objects are missing, system 300 may generate a warning signal, such as audible or visual, to the user, generate a notice to a remote server coupled to system 300, etc.

In another implementation, the image sensing device is configured to form images of the storage locations both when storage drawer 330 moves in a direction allowing increasing access to its contents, and when storage drawer 330 subsequently moves in a direction allowing decreasing access to its contents. For example, when a user opens drawer 330 to retrieve tools, the moving direction of drawer 330 triggers cameras 310 to capture images of drawer contents when it moves. The captured image may be designated as a "before access" image representing a status before a user has accessed the contents of each storage drawer. An inventory condition is determined based on the captured images. This inventory condition is considered as a "before access" inventory condition. Cameras 310 stops capturing images when drawer 330 stops moving. When the user closes drawer 330, the moving direction of drawer 330 triggers cameras 310 to capture images of drawers 330 again until it stops or reaches a close position. An inventory condition of the drawer is determined based on images captured when the user closes drawer 330. This determined inventory condition is designated as an "after access" inventory condition. A difference between the before access inventory condition and the after access inventory condition indicates a removal or replacement of tools. Other implementations of this disclosure control cameras to take the "before access" image before a storage drawer is opened or after the storage drawer is fully opened or when its contents are accessible to a user. According to another implementation, the image sensing device is timed to take an image of each drawer 330 when it was detected that access by a user is terminated. As used herein in this disclosure, terminated access is defined as a user no longer having access to any storage locations, such as when drawer 330 is closed or locked, when door 250 is closed or locked, etc., or an indication by the user or the system that access to the storage system is no longer desired, such as when a user signs off, when a predetermined period of time has elapsed after inactivity, when a locking device is locked by a user or by system 300, etc. For each access, a position detector or contact sensor is used to determine whether drawer 330 is closed.

After the drawer is closed, the image sensing device captures an image of drawer 330. The data processing system then determines an inventory condition based on the captured image or images. A difference in the inventory condition may be determined by comparing the determined inventory condition of the current access to that of the previous access.

Figure 7A:
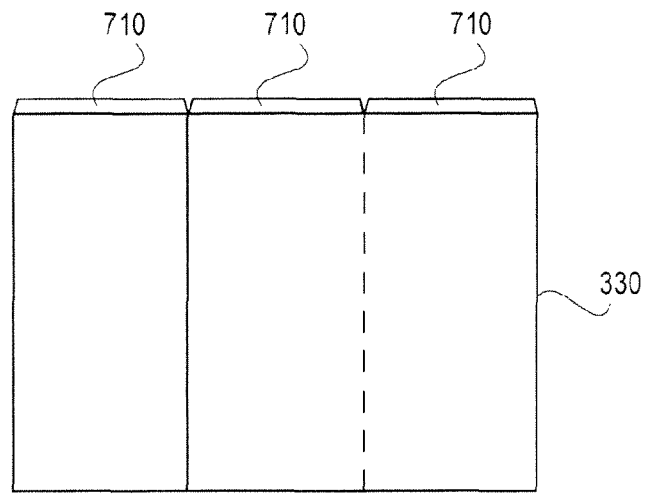
FIGS. 7A and 7B are different views of another implementation of camera designs.
Figure 7B:
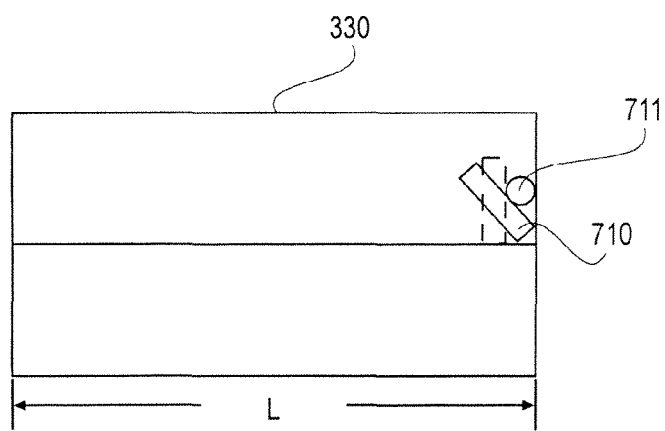

FIGS. 7a and 7b show an exemplary drawer having cameras configured to capture images of the drawer when it is closed. FIG. 7a is a top view of a drawer 330 having three cameras 770. Cameras 770 have sufficient widths of viewing fields to cover the entire width of drawer 330. FIG. 7b is a side view of drawer 330 shown in FIG. 7a. Camera 710 tilts down a specific angle and has a sufficiently large viewing field to cover the entire length L of drawer 330. In one implementation, cameras 710 does not have to cover the entire length L with one image. Rather, camera 710 may be rotatably attached to a hinge 711, which allows camera to tilt up and down vertically, to cover different sections of drawer 330. Images captured by cameras 710 are stitched or combined to form an image of the entire drawer.

It is understood that other camera configurations or designs may be utilized to capture images of drawer 330 when it is closed. In one implementation, one or more moving cameras are used to capture images of a drawer after it is closed. In this implementation, the cameras are configured to move over the drawer and capture image slices that can be stitched together to create a full drawer images. The cameras may be moved by a motor along a rail. Either 2D or line scan cameras can be used in this model. A sensor may be used to determine the location of the cameras to assist in stitching or other functions such as camera position control. A variation of this model uses a stationary camera for each drawer viewing across the top of the drawer and a 45 degree moving mirror that moves over the draw and redirects the camera view towards the drawer. Another variation is to provide a camera moving from one drawer to another. Still another variation is to provide a moving minor for each drawer and one or more cameras moving between drawers. The movements of the cameras and minors are synchronized to form images of each storage drawer. The cameras and drawers may be driven by motors or any means that provide power.

If the image sensing device requires illumination to obtain acceptable image quality, illumination devices may be provided. For example, LEDs may be used to illuminate the image area. It is understood that other illumination sources may be used. In one implementation, LEDs are disposed surrounding the lens or image sensors of the camera and light is transmitted along the same path as the camera view. In an implementation including the use of a light directing device, such as a minor, the emitted light would be directed by the minor towards the drawers. The timing and intensity of the illumination is controlled by the same processor that controls the camera and its exposure. In some possible configurations of cameras it may be desirable to implement background subtraction to enhance the image. Background subtraction is a well known image processing technique use to remove undesirable static elements from an image. First an image is captured with illumination off. Then a second image is captured with illumination on. The final image is created by subtracting the illumination off image from the illumination on image. Image elements that are not significantly enhanced by the illumination are thereby removed from the resulting image.

According to another implementation, for each access, the image sensing system 300 is timed to capture at least two images of drawer 300: at least one image (initial image) captured before a user has access to storage locations in drawer 300 and at least one image captured after the access is terminated, as discussed earlier. The initial image may be taken at any time before the user has access to the contents or storage locations in the drawer. In one implementation, the initial image is captured when or after a user requests access to system 300, such as by sliding a keycard, punching in password, inserting a key into a lock, providing authentication information, etc. In another implementation, the initial image is captured before or in response to a detection of drawer movement from a close position or the unlock of a locking device of system 300.

The data processing system of system 300 determines an inventory condition based on the initial image, and assigns the determined inventory condition as "before access" inventory condition; and determine an inventory condition based on the image captured after the access is terminated and designated the determined inventory condition as "after access" inventory condition. A change in the inventory condition of objects in system 300 may be determined based on a comparison of the "before access" and "after access" inventory conditions or a comparison of the initial image and the image captured after the access is terminated.

Concepts and designs described above may be applicable to other types of storage systems, such as a type shown in FIG. 1B, where a single door controls the access to multiple shelves or drawers. In one implementation, the image sensing device may be timed to capture images of the storage locations when or after a detected termination of access, such as closing door 250, locking door 250, signing out, etc. It is understood that various types of sensors, such as contact sensors, infrared sensors, may be used to determine when a door is closed. Similar to the discussions earlier, the image sensing device captures images of the storage locations, and determine an "after access" inventory condition based on the captured image. A change in the inventory condition related to the access by comparing an inventory condition of the current access and that of the last access. According to another implementation, the image sensing device is timed to take "before access" images of the storage locations before a user has access to the storage system. For instance, the cameras may be timed to capture images of the storage locations when or after a user requests access to the system, after detecting an opening of door 250, after receiving authentication information from a user, etc. The storage system determines a "before access" inventory condition based on the "before access" image. A change in the inventory condition may be determined according to a difference between the "before access" and "after access" inventory conditions, or a difference between the "before access" and "after access" images.

Networked Storage Systems

Figure 8:
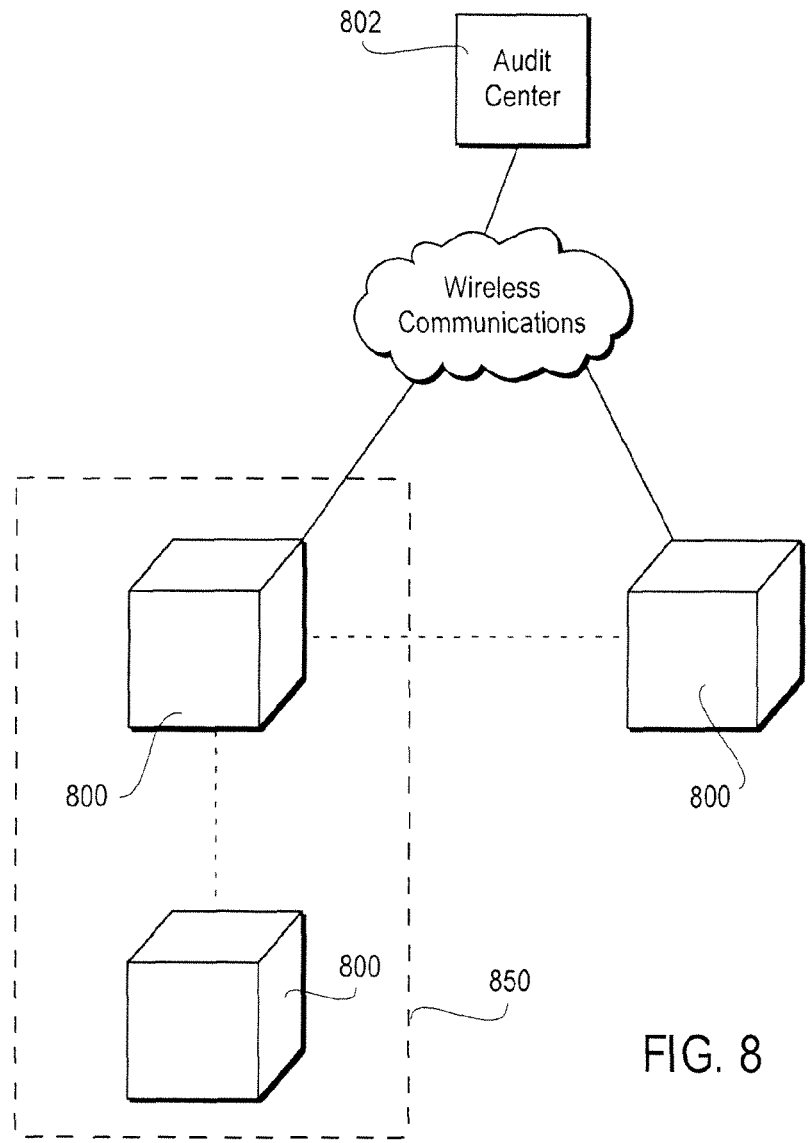
FIG. 8 is a block diagram of an exemplary networked inventory control system.

Storage systems described in this disclosure may be linked to a remote server in an audit center, such that inventory conditions in each storage system is timely updated and reported to the server. As shown in FIG. 8, a server 802 is coupled to multiple storage systems 800 via a wireless network. Server 802 may include a database server, such as a Microsoft SQL server. Information related to authentication, authorized users, inventory conditions, audit trails, etc., is stored in the database.

In one implementation, each storage system 800 is provided with a data transceiver, such as an 802.11g or Ethernet module. The Ethernet module connects directly to the network, while a 802.11g module may connect through a 802.11g router connected to the network. Each of these network modules will be assigned a static or dynamic IP address. In one implementation, storage systems 800 check in to the server through the data transceivers on a periodic basis, to download information about authorized users, authorization levels of different users or different keycards, related storage systems, etc. Storage systems 800 also upload information related to the systems such as inventory conditions, drawer images, tool usage, access records, information of user accessing storage systems 800, etc., to server 802. Each storage system 800 may be powered by an AC source or by a battery pack. An uninterruptible power supply (UPS) system may be provided to supply power during a power failure.

Server 802 allows a manager or auditor to review access information related to each storage system 800, such as inventory conditions and information related to each access to storage system 800 like user information, usage duration, inventory conditions, changes in inventory conditions, images of drawers or contents of the storage system, etc. In one implementation, server 802 may form a real time connection with a storage system 800 and download information from that storage system. The manager or auditor may also program the access control device on each storage system through server 802, such as changing password, authorized personnel, adding or deleting authorized users for each storage system, etc. Authorization data needed for granting access to each storage system 800 may be programmed and updated by server 802 and downloaded to each storage system 800. Authorization data may include passwords, authorized personnel, adding or deleting authorized users for each storage system, user validation or authentication algorithm, public key for encryptions and/or decryptions, black list of users, white list of users, etc. Other data updates may be transmitted to each storage system from server 802, such as software updates, etc. Similarly, any changes performed on storage system 800, such as changing password, adding or deleting authorized users, etc., will be updated to server 802.

For each access request submitted by a user, a storage system authenticates or validates the user by determining a user authorization according to user information input by the user via the data input device and the authorization data. According to a result of the authentication, the data processor selectively grants access to the storage system by controlling an access control device, such as a lock, to grant access to the storage system 800 or one or more storage drawers of one or more storage systems 800.

Server 802 also allows a manager to program multiple storage systems 800 within a designated group 850 at the same time. The manager may select which specific storage systems should be in group 850. Once a user is authorized access to group 850, the user has access to all storage systems within group 850. For instance, a group of storage systems storing tools for performing automotive service may be designated as an automotive tool group, while another group of storage systems storing tools for performing electrical work may be designated as an electrical tool group. Any settings, adjustments or programming made by Server 802 in connection with a group automatically apply to all tool storage systems in that group. For instance, server 802 may program the tool storage systems by allowing an automotive technician to access all tool storage systems in the automotive tool group, but not those in the electrical tool group. In one implementation, each system 800 only includes minimal intelligence sufficient for operation. All other data processing, user authentication, image processing, etc., are performed by server 802.

Similarly, server 802 also allows a manager to program multiple storage drawers 330 within a designated group at the same time. The manager may select which specific storage drawers, of the same system or different storage systems, should be in the group. Once a user is authorized access to the group, the user has access to all storage drawers within the group. For instance, a group of storage systems storing tools for performing automotive tools may be designated as an automotive tool group, while another group of storage systems storing tools for performing electrical work may be designated as an electrical tool group.

In another implementation, an exemplary networked storage system as shown in FIG. 8 utilizes hierarchical authorization architecture to manage access to storage systems. One or more storage systems 800 are given the status of master storage system. Each master storage system has one or more associated slave storage systems. If a user is authorized to access to a master storage system, the same user is automatically authorized to access any slave storage system associated with that master system. On the other hand, if a user is authorized to access a slave storage system, the authorization to the slave system does not automatically grant the user access to its associated master storage system or other slave storage systems associated with the same master storage system.

According to still another implementation, an exemplary networked storage system as shown in FIG. 8 grants user access by utilizing multiple hierarchical authorization levels. Each authorization level is associated with pre-specified storage systems, which can be programmed by a manager via server 802. When a user is assigned a specific authorization level, this user is authorized to access all storage systems associated with the assigned authorization level and all storage systems associated with all authorization levels lower than the assigned authorization level in the authorization hierarchy, but not to those associated with authorization levels higher than the assigned authorization level in the authorization hierarchy.

Audit

An exemplary inventory control system according to this disclosure tracks various types of information related to each access. For example, system 800 records date, time and/or duration for each access, and corresponding user information submitted by a user to obtain access to system 800. As discussed earlier, system 800 captures one or more images of the storage unit during each access for determining an inventory condition. The images are linked to each access and accessing user and stored in system 800. System 800 may store the information locally or upload the obtained information to server 802 via the wireless communication network, as shown in FIG. 8.

Server 802 may process and compile the information received from each system 800, to create an audit trail for each server 802. The audit trail is accessible by managers or users with suitable authorization levels. Different types of audit trails may be generated and retrieved based on preference of authorized users. For instance, an audit trail may be generated for one or more specific dates, one or more specific users, one or more specific tools, one or more IDs, etc. Additional information and analysis may be generated and provided by server 802. For example, system 802 may track usages of a specific tool over time, and generate a report summarizing a usage frequency for each tool for evaluation. Such report may be used to determine what tools are used more frequently and which tools probably are not needed because they are used less often than others.

FIG. 9a shows an exemplary screen of an audit trail with respect to a specific storage system 800. Each access to system 800 is identified by Date/Time 920 and user information 910 of users associated with each access. User information may include any information submitted by a user when requesting access to system 800, such as finger prints, facial recognition images, user images taken by user cameras, passwords, information stored in keycards, any information for authentication, etc. In one implementation, data of user facial characteristics of each user is stored in system 800 or server 802. For each access, an image of a user accessing system 800 is captured by a user camera. User information submitted by the user for gaining access to system 800, such as information stored in a keycard and/or password, is collected. The captured image is compared against user facial characteristics of a user identified by the user information. System 800 or server 802 determines whether the facial characteristics of the user accessing system 800 matches facial characteristics of the user identified by the user information.

Figure 9B:
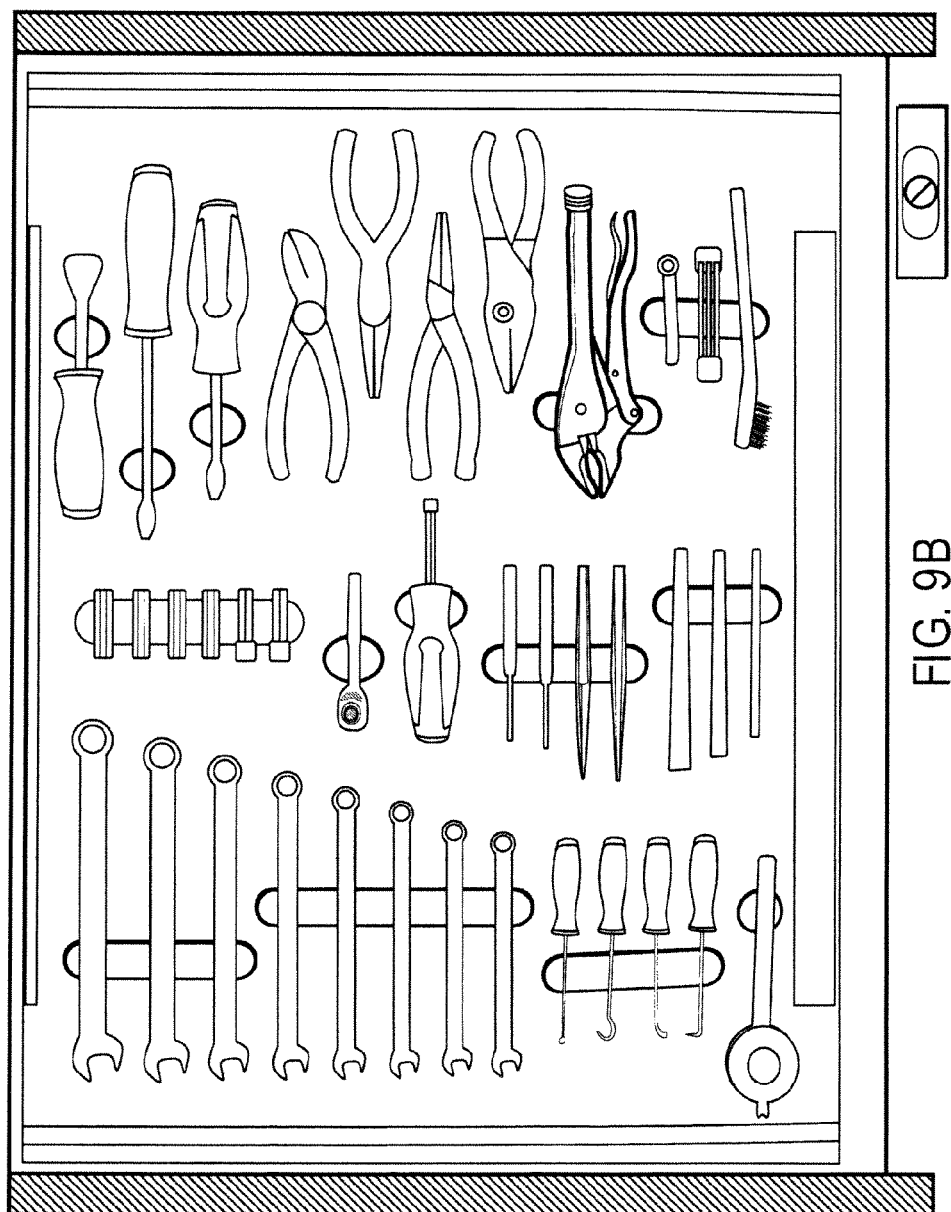
Figure 9C:
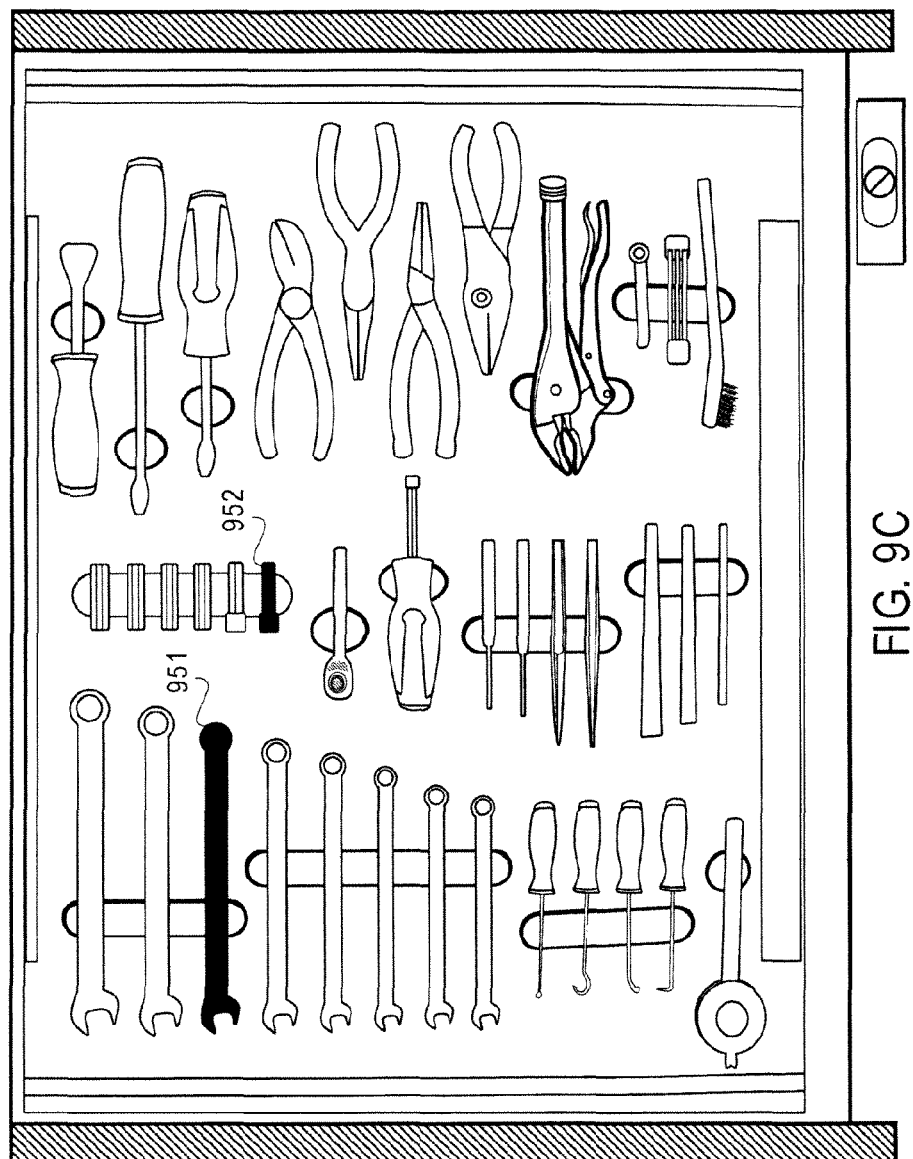
Figure 9D:
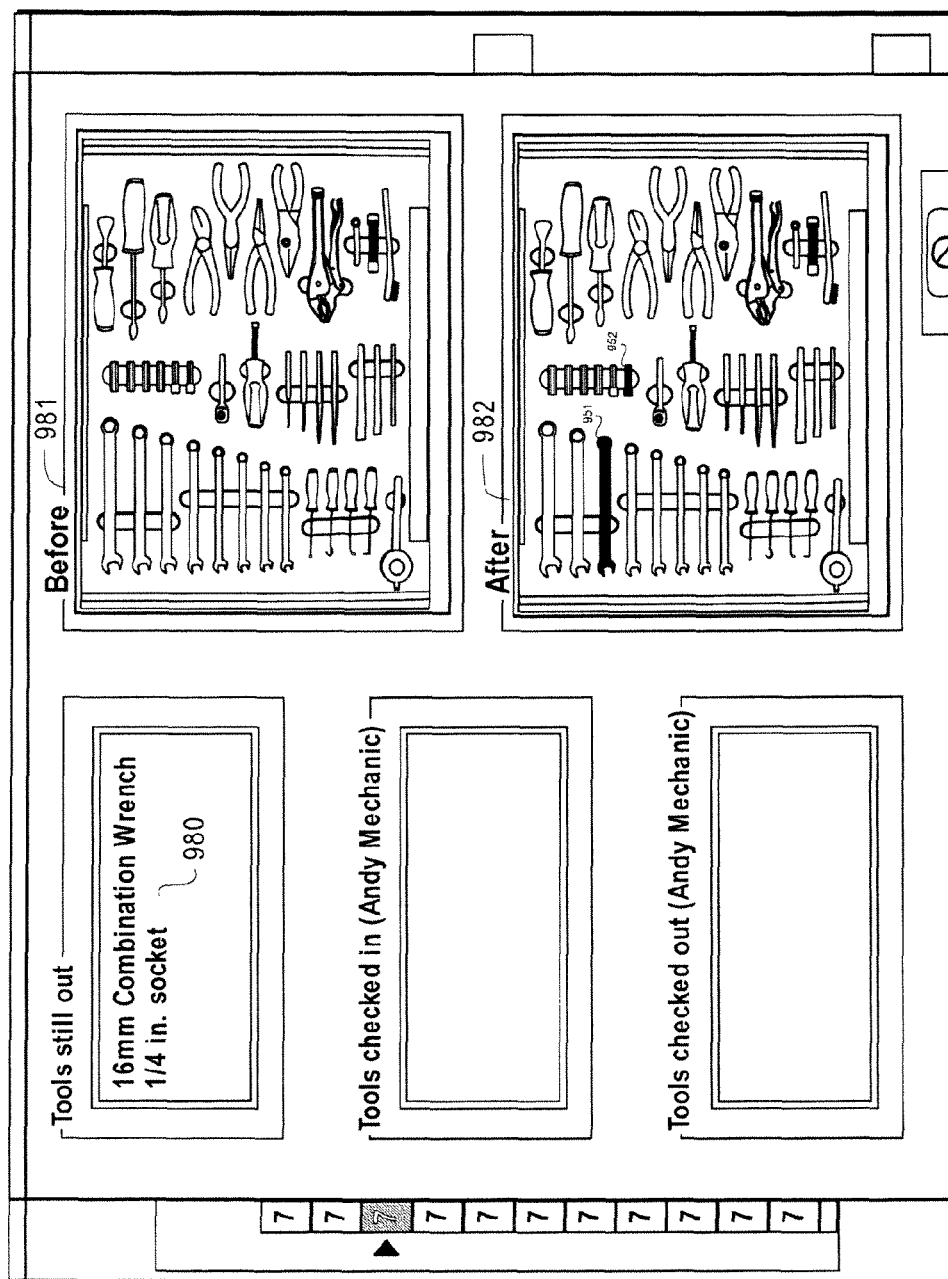

One or more images are taken during each access to storage system 800. FIG. 9b shows an exemplary "before access" image taken by cameras of system 800 before a user has access to the storage locations or when the drawer is moving in the first direction, as discussed earlier in this disclosure. As shown in FIG. 9b, each tool is properly stored in its corresponding storage location. FIG. 9c shows an exemplary "after access" image taken by cameras of system 800 after the access is terminated or when a storage drawer moves in the second direction as discussed earlier. As shown in FIG. 9c, tools corresponding to storage locations 951 and 952 are missing. Based on the image shown in FIG. 9c, system 800 determines that tools in storage locations 951 and 952 are missing. An audit trail is generated regarding the missing tools and the user associated with the access. FIG. 9d shows an exemplary record stored in system 800 and/or server 802, in which both "before access" and "after access" images 981 and 982 are stored. Missing tools are identified according to "after access" image 982 and listed in area 980.

Individual Tool Training

In conventional imaging-based automated tool control systems, the sensors (i.e., cameras) must be programmed to scan certain areas of interest in the tool control storage device drawers or trays as they pass by the sensors' field of view during the process of opening and closing the drawers or trays. This programming or "training" process begins with the creation and use of a text file by the system's computer, which defines an (x,y) coordinate system for each drawer or tray. The coordinate system in the text file corresponds to the (x,y) dimensions of the drawers or trays, and teaches the cameras to look in specific areas for positional information; e.g., in the form of a series of dots placed on the drawer or tray layers. The text file also provides coordinate data for the drawer or tray layer, which data provides positional information for specific areas to scan for image data of the specific tool silhouettes or tools.

Typically, the cameras must scan each tool in the drawer or tray to complete the tool training process, so the cameras know the relevant data for each tool silhouette in the drawer or tray. Since there can be upwards of 120 tools per drawer or tray, scanning each tool in a drawer or tray and recording the relevant data takes a significant amount of time. This is clearly disadvantageous where a single tool in a drawer or tray containing many tools changes parameters (e.g., a change in the color or size of a screwdriver handle), and the system must be retrained to recognize the new parameters of the tool that changed. In current systems, all the tools in the drawer or tray must be scanned and all parameter data for each of the scanned tools recorded when an originally-scanned tool is replaced with a new tool.

Figure 10:
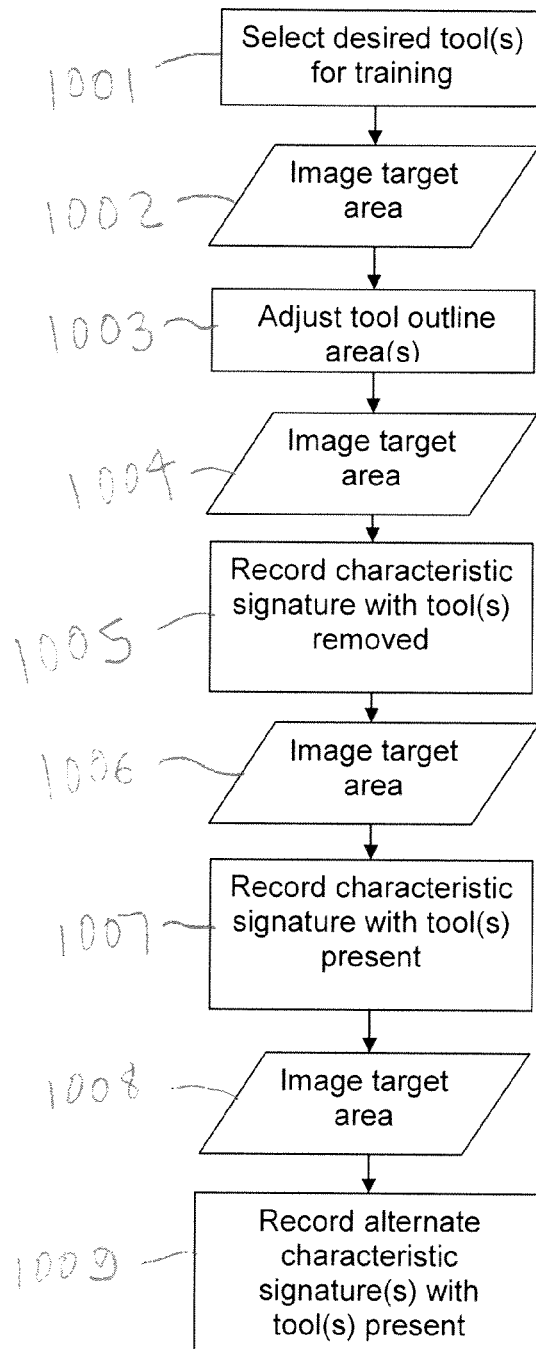
FIG. 10 is a flow chart illustrating an individual tool training process according to the present disclosure.
Figure 11:
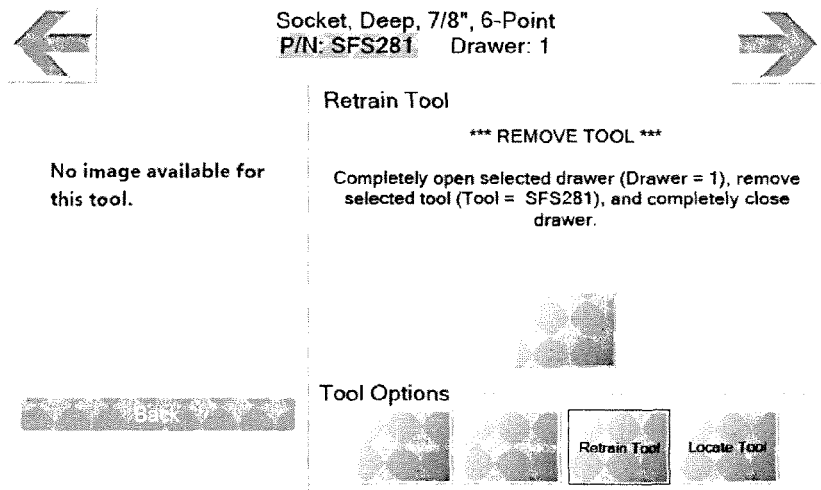
FIG. 11 illustrates a user interface for the tool training process of FIG. 10.

The embodiment described here advantageously provides tool training of a single tool silhouette in a drawer or tray containing many tools, where the drawer or tray had been previously trained and all parameters of all tools had been scanned and stored. Referring now to FIGS. 10 and 11, according to this embodiment, the computer application for tool options is called up on the system's touch screen (e.g., display 305 shown in FIG. 3 of the system described herein above) and the program for "single tool training" is selected (see FIG. 11).

Following the selection of a single tool training program, the user selects the start button. An image of the drawer or tray with the tool selected for training will appear on the screen. The selected tool is highlighted by the user, and the user is asked if this is the tool selected for re-training. If the user responds in the affirmative, then the single tool training routine is invoked (step 1001 of FIG. 10). If the response is negative, then the user is asked to select another tool or they can exit the program. Alternatively, the user can be presented with a list of tools to choose from at step 1001 when the single tool training program is initiated.

Once the tool training program is started, the drawer or tray containing the individual tool silhouette to be retrained is scanned to image the target area (i.e., the area of the original tool). See, step 1002 of FIG. 10. Then, the computer system adjusts the tool outline area for that tool (step 1003), by comparing the image to the text file. The drawer or tray is scanned again with the original tool removed (step 1004) to record the silhouette characteristic signature with the tool absent (step 1005).

The next step is to replace the original tool with the new tool and rescan the drawer or tray (step 1006) to obtain and record the silhouette characteristic signature with the new tool present (step 1007). Additional scans of the tool silhouette (step 1008) may be recorded with the new tool in alternate positions so that multiple present characteristics may be recorded (step 1009).

The user then is given the opportunity to retrain another tool or to exit the program.

Thus, in this embodiment the system takes initial image data representing an initial image of the plurality of storage locations, and image data representing an image of the target area captured subsequent to the initial image; modifies the initial image data based on the image data of the target area to generate adjusted image data; and stores the adjusted image data.

Automated Creation of Tool Control System Layers with Tool Cutouts

As discussed herein above and shown in FIG. 2, an accepted method of controlling objects, such as tools, in storage devices is to create a foam layer or sheet 180 with silhouettes 181 of the individual objects cut into the foam. Typically, a hard backing layer with a contrasting color will be adhered to the bottom of the foam layer 180 after the silhouettes 181 have been cut. The intention is to provide the user of the object a visual aid in replacing the tool and identifying which tools are missing.

This technique is used in automated tool control systems with both imaging and non imaging capabilities. In automated tool control systems with imaging capabilities, the edges of the silhouettes 181 are identified, and the areas surrounded by the edges of the silhouettes are identified as areas of interest. Processors of automated tool control systems with imaging capabilities use the color of the backing layer as a color signature for the empty pocket, and run programs to record a tool as issued when the color signature is recognized. When the tool is in place in the pocket, imaging tool control systems use the color signature of the tool in the pocket to determine presence signatures. Non imaging based automated tool control systems use the silhouettes to ensure the objects are in place so that a sensor located in near proximity to or in the pocket can sense the presence or absence of the tool in the pocket.

Moreover, in both imaging and non imaging based automated tool control systems, the silhouette cutouts in the foam layer provide the user of the object a means of visually confirming the presence and absence of objects in the storage device.

Conventional processes used to create foam layers are both time consuming and expensive. Procedures currently employed for producing tool control foam layers typically include the following steps:

1. Obtain required tool list from customer including part number, description and quantity;
2. Obtain or create silhouettes for each tool using 2D CAD drawings, 3D CAD models, photographs on a grid or with a scale, or a flat bed scanner with grid or scale. The last two options require a program such as PhotoShop™ be used to manipulate the images.
3. Lay out the tools in the appropriate size "drawer or tray" fitted to a specific storage device;
4. Assign part numbers to silhouettes;
5. Insert finger notches and channels;
6. Produce parts list and layout;
7. Submit for approval to customer;
8. Obtain approval;
9. If changes are required, then resubmit and obtain approval;
10. Create machine tool ready programs to produce the layers with silhouettes;
11. Produce layers;
12. Ship to customer and install in tool storage device.

An alternate method currently in use employs a backlit "light box" with a grid and a single camera suspended above the surface of the light box. Images are obtained and the process then follows steps 3 through 12 listed above.

Silhouettes obtained from 2D drawings and 3D models are usually accurate and need only be adjusted to provide the proper clearance for the tool. Images created using photographic images from flat bed scanners and cameras must be manipulated to eliminate parallax. Another disadvantage of the current method is that the back lit devices with a single camera are not large enough to produce images of a complete drawer or tray. A photograph of a proposed section of the drawer or tray must be taken, then the tools are removed and the tools contained in the second portion of the drawer or tray are loaded on the backlit surface and images are captured. The images are combined at a later time.

Thus, in conventional systems, there can be multiple delays due to the number of iterations and poor communications.

According to this embodiment, multiple cameras in an imaging based tool control system are used to obtain stereoscopic images of the objects laid out in the tool storage device container (i.e., drawer or tray) as they would be in normal use. The entire contents of the drawer or tray are laid out and images obtained. The tool silhouette areas are then isolated from the remainder of the layer.

The images from the multiple cameras are then sewn together and parallax is calculated from the stereoscopic image data and eliminated. Once the parallax is eliminated, finger notches and channels can be inserted into the drawer or tray file automatically or manually by the operator. Parts lists and layout are then prepared via computer program for review.

Another feature of this embodiment is a computer program to create machine ready data files to produce the foam layers. When the drawer or tray layout with silhouettes is complete, the operator invokes the program to produce the files for the machine tool. These are forwarded to the foam vendor.

Figure 12:
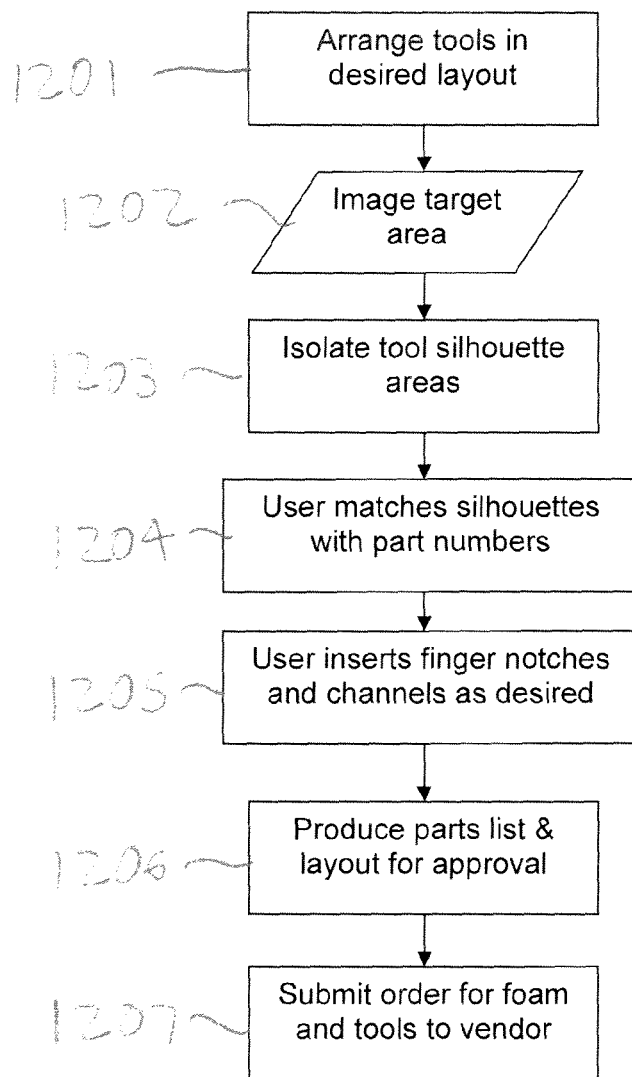
FIG. 12 is a flow chart illustrating a process for generating a storage layer according the present disclosure.

This embodiment can be implemented using the tool control system described herein above with reference to FIGS. 1-4D. Referring now to the flow chart of FIG. 12, at step 1201, the objects to be inventoried (such as tools) are arranged in a desired layout on a surface of a storage container of the system, such as the bottom of a drawer 330. At step 1202, the surface (referred to as the "target area" in FIG. 12) is imaged by cameras 310. As shown in FIG. 4D and explained above, overlapping partial images 41-45 can be taken by different cameras 310 and stitched together to form a single image of the target area that is free of inaccuracies related to parallax.

At step 1203, the system processor analyzes the image data to isolate tool silhouettes, and generates a data file defining the shape and position of each of the tools in the drawer. Those of skill in the art will understand this step can be accomplished, for example, by segmenting the image data into a background layer and a foreground layer by exploiting known properties of the drawer foam that will contain the scanned tools (e.g., a uniform color and texture). After identifying areas of the image that match the properties of the drawer foam, the remaining areas are foreground and are assumed to be tools. The isolated foreground pixels are then grouped into connected regions, and each group of connected pixels is classified as a tool silhouette. A known computer aided design (CAD) program such as Graphite, available from Vellum Investment Partners of Austin, Tex., is usable to implement this embodiment.

The user can then match each of the silhouettes with a tool part number (step 1204), and insert finger notches and channels as desired for each tool silhouette (step 1205). After the user has completed entering data and manipulating the individual silhouettes, the parts list and layout is produced for approval (step 1206), and thereafter can be submitted to vendor(s) to produce the foam layer and obtain the tools (step 1207).

In a further embodiment, the system processor has a program for generating data files usable by a machine tool to cut a foam layer(s). Thus, after approval at step 1206, the user can invoke the program to produce the necessary machine ready data files, and forward them to a foam vendor in step 1207. Those skilled in the art will appreciate that a commercially available computer program such as Adobe Illustrator or Photoshop can be used to implement this step; e.g., by generating a dxf file for export to a machine tool. Thus, this embodiment provides manufacturing data usable in production of storage layers containing the storage locations and shapes of the tools to be stored.

An advantage of the system of this embodiment is that the user has the silhouette and foam layout creation system in a toolbox on site where tools and users are readily available for layout of tools prior to image acquisition, and approval can be obtained immediately following the completion of the drawer or tray layer designs.

Automated Foam Sheet Changeout Process

As discussed herein above, inventory in a tool control system is often stored in recessed pockets 181 cut out of a foam or hard plastic sheet 180, as shown in FIG. 2. The pockets 181 are cut to match the silhouettes of the inventory stored in that sheet 180. The sheet 180 could be stored in a toolbox or cabinet drawer or tray 170, stacked in a hard plastic pallet, or even stored within another larger sheet. Many automated tool control systems make use of these sheets for organizing their contents.

It is sometimes desired to change the layout or contents of a sheet contained in a tool control system. This requires updating the inventory list for the tool control system and updating the automatic tool control system containing the sheet.

Conventional methodology requires a user to perform the normal process to produce a new tool control sheet (such as sheet 180). This process includes selection of the new sheet inventory, layout of the contents, and acquisition of the new inventory and sheet. If the sheet is to be used in an automatic control system, additional steps are required. A user must manually update the tool control system inventory to reflect items that were removed or added, replace the sheet in the system, and then set up the automated tool control system to properly detect inventory in the new sheet.

Figure 13:
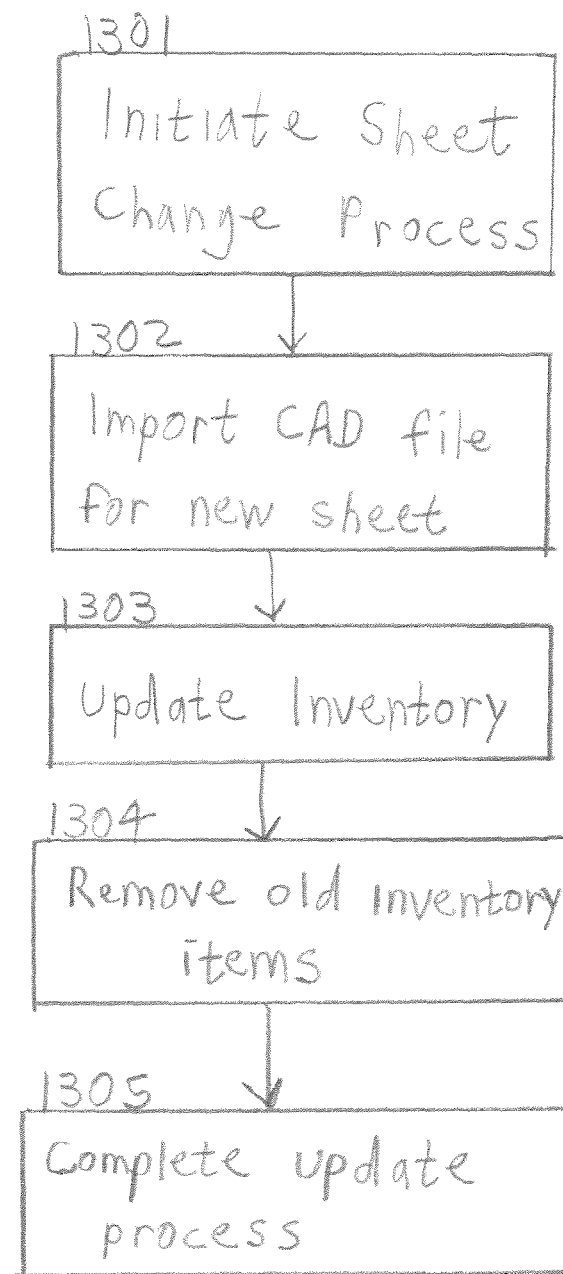
FIG. 13 is a flow chart illustrating a process for automating changeout of a storage layer according the present disclosure.

The solution of this disclosed embodiment provides for a single point of data entry in the sheet change process, removing time consuming and error prone redundant data entry steps. According to this embodiment, referring to the flow chart of FIG. 13, the user initiates the sheet change process at the target tool control system or at a master control terminal (step 1301).

At step 1302, a CAD file used to cut the foam sheet and its silhouettes is imported into the tool control system. Relevant information required by the tool control system for each inventory item is contained in this file, including the part number, serial number, sheet location, silhouette shape, and any individualized inventory data. The tool control system assimilates this data and updates its inventory to include the new sheet and the tools it contains at step 1303.

The tool control system software associates each inventory item with the sheet that contains it. When a sheet is updated, all items contained in the old sheet are automatically removed from the system inventory. A sheet and its contents can be completely removed from the inventory system or transferred to a different tool control system location (see step 1304). More particularly, the tool control system compares the indentifying information from the list of tools in the "new" sheet to the list of tools in the "old"

sheet. It builds three lists from this comparison: tools removed (reference contained in the old list but not the new), tools added (reference contained in the new list but not the old), and tools updated (references contained in both lists). The master inventory is then updated to delete items from the "tools removed" list, add items from the "tools added" list, and update any data from the "tools updated" list.

At step 1305, the user is prompted to perform any required steps to complete the update process. These steps can include scanning the new sheet to establish a baseline image in an image based tool control system (i.e., training the sheet, as described herein above).

FIGS. 14 and 15 provide functional block diagram illustrations of general purpose computer hardware platforms. FIG. 14 illustrates a network or host computer platform, as may typically be used to implement a server. FIG. 15 depicts a computer with user interface elements, as may be used to implement a personal computer or other type of work station or terminal device, although the computer of FIG. 15 may also act as a server if appropriately programmed. It is believed that the general structure and general operation of such equipment as shown in FIGS. 14 and 15 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device (e.g., the inventory control system) similarly includes a data communication interface CPU, main memory and one or more mass storage devices for storing user data and the various executable programs (see FIG. 15). The various types of inventory control systems will also include various user input and output elements. For example, the inventory control system may include a keyboard and a cursor control/selection device such as a mouse, trackball, joystick or touchpad; and a display for visual outputs. A microphone and speaker enable audio input and output. Some other inventory control systems include similar but smaller input and output elements. The inventory control system may utilize touch sensitive display screens, instead of separate keyboard and cursor control elements. The hardware elements, operating systems and programming languages of such user terminal devices also are conventional in nature.

Hence, aspects of the methods of monitoring removal and replacement of tools within an inventory control system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server 802 to the inventory control system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the monitoring removal and replacement of tools within an inventory control system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An inventory control system comprising:
a storage container including a plurality of storage locations for storing objects;
an image sensing device configured to capture image data of the container, including image data of all of the plurality of storage locations, and of a target area of the container that includes an individual object storage location comprising less than the plurality of storage locations;
a data storage device for storing the image data of the container; and
a data processor configured to: receive initial image data representing an initial image of the plurality of storage locations, receive image data representing an image of the target area captured subsequent to the initial image, wherein an object stored in the target area when the image of the target area is captured may not be recognized based on the initial image data;
modify the initial image data based on the image data of the target area to generate adjusted image data; and
store the adjusted image data in the data storage device;
whereby the inventory control system can be trained or re-trained to determine the inventory condition of the object stored in the target area using the adjusted image data.

2. The inventory control system of claim 1, wherein the storage container comprises a drawer or a tray.

3. The inventory control system of claim 1, wherein the initial image of the plurality of storage locations is captured when all the objects are present, and the image of the target area is captured when the individual object is present; and
wherein the data processor is further configured to receive image data representing an image of the target area captured when the individual object is not present, and store the image data in the data storage device.

4. The inventory control system of claim 1, wherein the objects comprise tools.

5. A method comprising:
receiving, in an inventory control system having a storage container including a plurality of storage locations for storing objects, selection of a target area of the container that includes an individual object storage location comprising less than the plurality of storage locations;
capturing via an image sensing device of the inventory control system initial image data representing an initial image of the plurality of storage locations;
capturing via the image sensing device image data representing an image of the target area subsequent to the initial image, wherein an object stored in the target area when the image of the target area is captured may not be recognized based on the initial image data;
modifying via a data processor of the inventory control system the initial image data based on the image data of the target area to generate adjusted image data; and
storing via the data processor the adjusted image data in a data storage device of the inventory control system;
whereby the inventory control system can be trained or re-trained to determine the inventory condition of the object stored in the target area using the adjusted image data.

6. The method of claim 5, wherein receiving selection of the target area includes receiving a selection of the target area from a user operating the inventory control system.

7. The method of claim 6, wherein the initial image of the plurality of storage locations is captured when all the objects are present, and the image of the target area is captured when the individual object is present; the method further comprising:
removing the individual object from the target area;
capturing image data representing an image of the target area when the individual object is not present; and
storing the image data.

* * * * *